US007054489B2

(12) United States Patent
Yamaoka et al.

(10) Patent No.: US 7,054,489 B2
(45) Date of Patent: May 30, 2006

(54) APPARATUS AND METHOD FOR IMAGE RECOGNITION

(75) Inventors: Megumi Yamaoka, Tokyo (JP); Kenji Nagao, Kanagawa (JP)

(73) Assignee: Matsushita Electric Industrial Co., Ltd., Osaka (JP)

( * ) Notice: Subject to any disclaimer, the term of this patent is extended or adjusted under 35 U.S.C. 154(b) by 2 days.

(21) Appl. No.: 10/677,866

(22) Filed: Oct. 2, 2003

(65) Prior Publication Data

US 2004/0062435 A1   Apr. 1, 2004

Related U.S. Application Data

(62) Division of application No. 09/676,680, filed on Sep. 29, 2000.

(30) Foreign Application Priority Data

Sep. 30, 1999   (JP)   ................................. 11-278708
Jul. 18, 2000    (JP)   ............................ 2000-216946

(51) Int. Cl.
    *G06K 9/56*   (2006.01)
(52) U.S. Cl. ...................................... 382/203
(58) Field of Classification Search ................ 382/203, 382/190
    See application file for complete search history.

(56) References Cited

U.S. PATENT DOCUMENTS 5,265,173 A * 11/1993 Griffin et al. ................ 382/103
5,640,468 A *  6/1997 Hsu ............................ 382/190
5,771,307 A *  6/1998 Lu et al. ..................... 382/116
5,910,817 A    6/1999 Ohashi et al.

(Continued)

FOREIGN PATENT DOCUMENTS

JP         64-046890         2/1989

(Continued)

OTHER PUBLICATIONS

Lanitis et al. "A General Non-Linear Method for Modelling Shape and Locating Image Objects." Proc. of the 13th Int. Conf. on Pattern Recognition, vol. 4, Aug. 25, 1996, pp. 266-270.*

(Continued)

*Primary Examiner*—Jingge Wu
*Assistant Examiner*—Charles Kim
(74) *Attorney, Agent, or Firm*—RatnerPrestia

(57) ABSTRACT

An object recognizing apparatus is provided which is capable of precisely recognizing an object in an input image with the use of a corresponding learning image even when a local-segment of the input image coincides with a learning-local-segment of another similar learning image. The apparatus comprises (1) image dividing means for dividing an input image, which is received from image input means, into local-segments, (2) similar-local-segment extracting means for extracting a similar learning-local-segment to the local-segment of the input image from a learning image database, (3) object position estimating means for estimating the position of an object to be identified in the input image from the coordinates of the local-segment and the coordinates of the learning-local-segment corresponding to the local-segment, (4) counting means for counting the local-segments coincide with their corresponding learning-local-segments, and (5) object determining means for judging that the object to be identified is present when a result of counting is greater than a predetermined number. Consequently, the object and its position in any input image can be detected at higher accuracy.

3 Claims, 32 Drawing Sheets

U.S. PATENT DOCUMENTS 6,819,782 B1 * 11/2004 Imagawa et al. ........... 382/115

FOREIGN PATENT DOCUMENTS

| JP | 6-215140 | 8/1994 |
|----|----------|--------|
| JP | 07-044689 | 2/1995 |
| JP | 07-182484 | 7/1995 |
| JP | 07-254068 | 10/1995 |
| JP | 9-21610 | 1/1997 |
| JP | 09-033232 | 2/1997 |
| JP | 11-306353 | 11/1999 |

OTHER PUBLICATIONS

Wang et al. "Model Based Segmentation and Detection of Affine Transformed Shapes in Cluttered images." Proc. Int. Conf. on Image Processing, ICIP 98, vol. 3, Oct. 4, 1998, pp. 75-79.*

Liu et al. "Face Recognition Using Shape and Texture." IEEE Computer Society Conf. on Computer Vision and Pattern Recognition, vol. 1, Jun. 23, 1999, pp. 598-603.*

* cited by examiner

Fig. 6

| Center Coordinates of Input Window | Center Coordinates of Learning Window |
|---|---|
| (40, 100) | (75, 365) |
| (119, 86) | (159, 350) |
| (198, 72) | (230, 340) |
| ⋮ | ⋮ |
| (54, 179) | (90, 440) |
| ⋮ | ⋮ |
| (291, 88) | (225, 345) |
| ⋮ | ⋮ |
| (208, 19) | (240, 280) |

Fig. 7

| Position | Score |
|---|---|
| (74, 365) | 29 |
| (20, 365) | 5 |
| ⋮ | ⋮ |

Fig. 11
1101
Representative Window
(25, 15)
1103
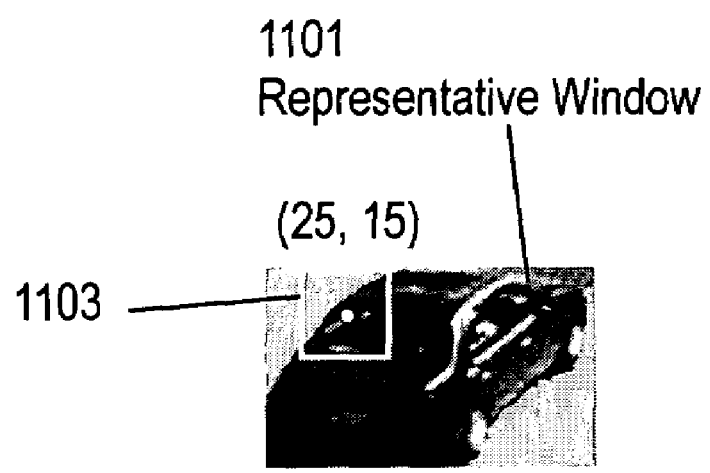
1102
Similar Window
(15, 20)
1104
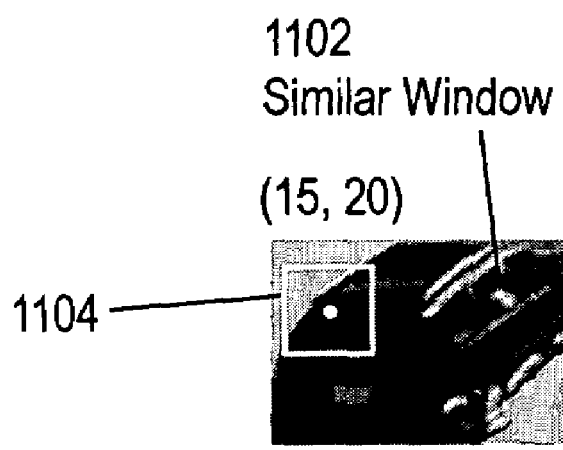

Fig. 12

| Center Coordinates of Input Window | Center Coordinates of Learning Window | Type of Learning Window |
|---|---|---|
| (40, 100) | (75, 365) | Sedan |
| (40, 100) | (150, 350) | Van |
| (40, 100) | (230, 340) | Wagon |
| ⋮ | ⋮ | ⋮ |
| (24, 178) | (90, 440) | ⋮ |
| ⋮ | ⋮ | ⋮ |
| (291, 88) | (225, 345) | ⋮ |
| ⋮ | ⋮ | ⋮ |
| (208, 19) | (240, 280) | |

Fig. 13

| Position | Score | Score by Type |
|---|---|---|
| (74, 365) | 29 | Sedan : 21,  Van : 8 |
| (20, 365) | 5 | Truck : 3,   Bus : 2 |
| ⋮ | ⋮ | ⋮ |
| • | • | • |

Fig. 16
Learning Image 10
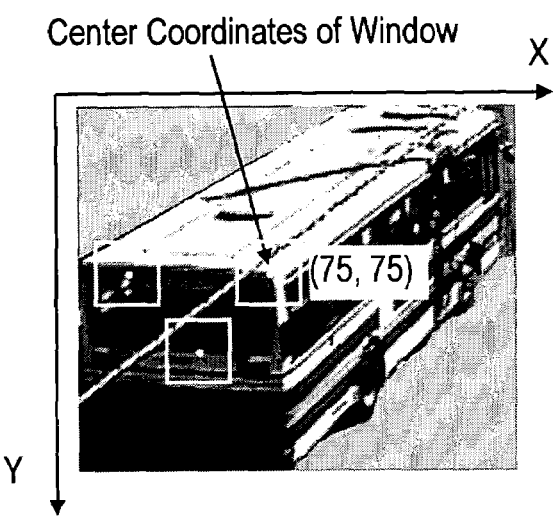
Learning Image 11
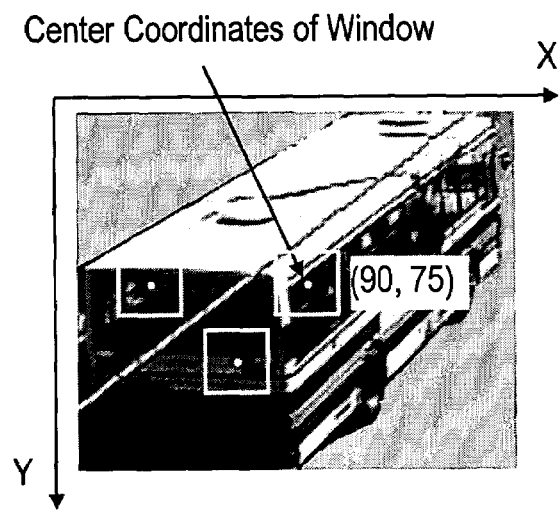

Fig. 21
Shape Identifier :
| Shape Name | : Sedan A |
|---|---|
| Image File Name | : sedan1 |
| Objective Area | : (0, 0) - (147, 87) |
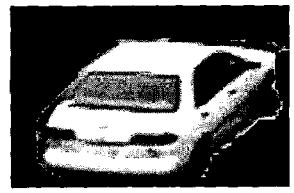
Shape Identifier :
| Shape Name | : Sedan A |
|---|---|
| Image File Name | : sedan2 |
| Objective Area | : (25, 30) - (172, 117) |
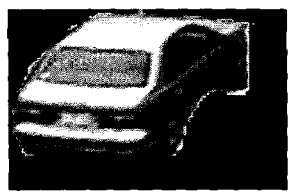
Shape Identifier :
| Shape Name | : Sedan A |
|---|---|
| Image File Name | : sedan3 |
| Objective Area | : (0, 0) - (147, 87) |
Fig. 22
Shape Identifier :
| Shape Name | : Sedan A |
|---|---|
| Image File Name | : average-sedan |
| Objective Area | : (0, 0) - (147, 87) |

Fig. 28
Shape Identifier :
| Shape Name | : Sedan A |
| Image File Name | : sedan1 |
| Objective Area | : (0, 0) - (147, 87) |
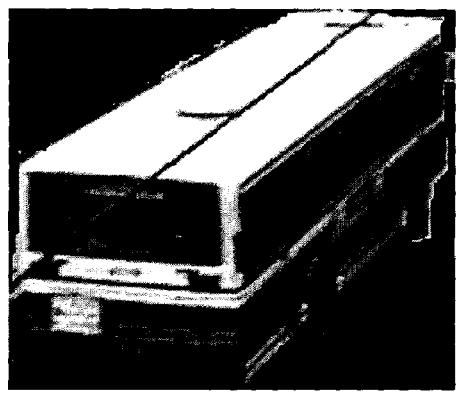  
Shape Identifier :
| Shape Name | : Bus Rear Portion |
| Image File Name | : bus1 |
| Objective Area | : (50, 100) - (197, 187) |

Fig. 34

| Position | Score |
|---|---|
| (74, 365) | 29 |
| (20, 365) | 5 |
| ● | ● |
| ● | ● |
| ● | ● |

APPARATUS AND METHOD FOR IMAGE RECOGNITION

This Application is a Divisional Application OF U.S. application Ser. No. 09/676,680 Filed Sep. 29, 2000.

FIELD OF THE INVENTION

The present invention relates to an apparatus and a method for recognizing an object displayed in an input image and releasing data of its position and shape.

BACKGROUND OF THE INVENTION

One of conventional image recognizing apparatus is known as disclosed in the Japanese Patent of (Publication No. 9-21610).

FIG. 35 is a block diagram of a conventional image recognizing apparatus which comprises:

(a) image input unit 3511 for receiving an image of interest;

(b) model memory unit 3512 which stores local models of an object to be identified;

(c) matching process unit 3513 for matching each image segment of the input image with the local models;

(d) local data integrating unit 3514 for integrating and displaying, in probabilistic way, the position of the object to be identified in a parameter space together with the position of the image segment depending on the degree of the matching of each image segment of the input image with its local model; and (e) object position determining unit 3515 for determining image segments with the highest probability from the parameter space to determine the position of the object to be identified in the input image.

The conventional image recognizing apparatus may carry out the recognizing operation with much difficulty as a number of similar local models of different models are increased.

Another conventional image recognizing apparatus is also known as disclosed in the Japanese Patent (Publication No. 6-215140).

FIG. 36 is a block diagram of the another conventional image recognizing apparatus which comprises:

(a) display 3601 for displaying an image;

(b) main controller 3602 for controlling operations of the entire system;

(c) internal memory 3603 for storing an operating program and the like;

(d) disk 3604 for storing a reference pattern;

(e) television camera 3605 for capturing an image of an object to be identified such as a product or a sample;

(f) image input unit 3606 for converting image data of the object captured by camera 3605 into a digital form;

(g) image rotating unit 3607 for positioning the object in a gradation image of the digital form to be faced in a given direction for each category;

(h) image data extracting unit 3608 for sampling the rotated image at a specific rate and extracting the gradation of each sampled image as characteristic data of the rotated image;

(i) dictionary generating unit 3609, having average vector calculator 3609A for calculating an average vector of the images of each category from the characteristic data, for determining a dictionary (a list of reference patterns) of the average vectors;

(j) identifying unit 3610 having vector distance comparator 3610A for calculating a vector of an object of an unknown category and for extracting, from the dictionary generating unit 3609, one of the average vectors which is closest to the calculated vector to identify the object on the unknown category; and (j) parameter setting unit 3611 for optimizing the parameters for image input 3606, the image rotating unit 3607, image data extracting unit 3608, and identifying unit 3610 in each category.

The another conventional image recognizing apparatus may hardly carry out the recognizing operation in case that the images of objects which are identical in the shape but different in the gradation are grouped in one category for recognizing and classifying the objects by shape. Since similar gradation images are grouped into one category, a total number of categories increases thus requiring more time for the operation.

SUMMARY OF THE INVENTION

A first object of the present invention is to estimate the position and the type of an object to be identified in an input image at high accuracy even when local models of different types are very similar.

An image recognizing apparatus according to the present invention comprises:

(a) image input means for inputting an image;

(b) image dividing means for dividing the image received from the image input means into input local-segments;

(c) similar window extracting means for extracting a learning-local-segment which is similar to each input local-segment received from the image dividing means;

(d) object position estimating means for estimating a position of an object to be identified in the input image from the coordinates of the input window and the coordinates of the learning window received from the similar window extracting means; and (e) counting means for counting a pair of the learning window and the input window for each position which is estimated from the learning window and the input window by the object position estimating means.

The operation of the image recognizing apparatus having the above arrangement of the present invention includes:

(1) extracting a learning window which is similar to a input window in the input image;

(2) estimating, in the input image, a position of a model in a learning image from the coordinates of the learning window in the learning image and the coordinates of the corresponding input window in the input image; and (3) counting a pair of the learning window and the input window for each position estimated from the learning window and the input window. Consequently, when the counted number is greater than a predetermined number, it is judged that the object of a type expressed with the learning image is present in the input image, and the position of the object can be estimated at high accuracy.

A second object of the present invention is to quickly recognize a shape of an object in an image and determine its position while the images of objects which are identical in the shape but different in the gradation are grouped into one category.

Another image recognizing apparatus according to the present invention comprises:

(a) an image database for preliminarily storing a shape identifier specifying a shape of an object to be identified and images of the object having the shape;

(b) model generating means for preliminarily extracting characteristic data of the shape from the model images;

(c) a shape database for preliminarily storing the characteristic data of the shape with its shape identifier;

(d) an image input unit for inputting an input image to be examined;

(e) an image cutout unit for cutting out an image segment from the input image as a partial image;

(f) shape classifying means for determining whether or not the object of the shape is present in the image segment by comparing the image segment with the characteristic data of the shape; and (g) an output unit for releasing, if there is an object having a shape which coincides with a shape in the input image, data about the shape of the object determined by the shape classifying means and about the position of the shape of the object in the input image.

The another image recognizing apparatus according to the present invention allows the characteristic data of the shape to be preliminarily extracted from many model images and to be compared with the input image. Accordingly, the another image recognizing apparatus can quickly examine whether or not the object is present in the input image from less amounts of data and, when so, readily provide the position and the shape of the object.

BRIEF DESCRIPTION OF THE DRAWINGS

FIG. 6 illustrates an example of a combination of an input window and a learning window released from similar window extracting means of Embodiment 1;

FIG. 7 illustrates an example of a resultant output of counting means;

FIG. 11 illustrates examples of same-type window data stored in a same-type window database of Embodiment 2;

FIG. 12 illustrates an example of a combination of an input window and a learning window released from similar window extracting means of Embodiment 2;

FIG. 13 illustrates an example of a resultant output of counting means of Embodiment 2;

FIG. 16 illustrates examples of learning image data stored in a learning image database for type X of Embodiment 3;

FIG. 21 illustrates examples of model images and their shape identifiers stored in an image database of Embodiment 4;

FIG. 22 illustrates an example of an average model image and its shape identifier stored in a shape database of Embodiment 4;

FIG. 28 illustrates examples of model images and their shape identifiers stored in an image database of Embodiment 5;

FIG. 34 illustrates an example of a resultant output of a counting unit of Embodiment 6;

DETAILED DESCRIPTION OF THE PREFERRED EMBODIMENTS

Exemplary embodiments of the present invention will be described in detail referring to FIGS. 1 to 34.

Embodiment 1

Figure 1:
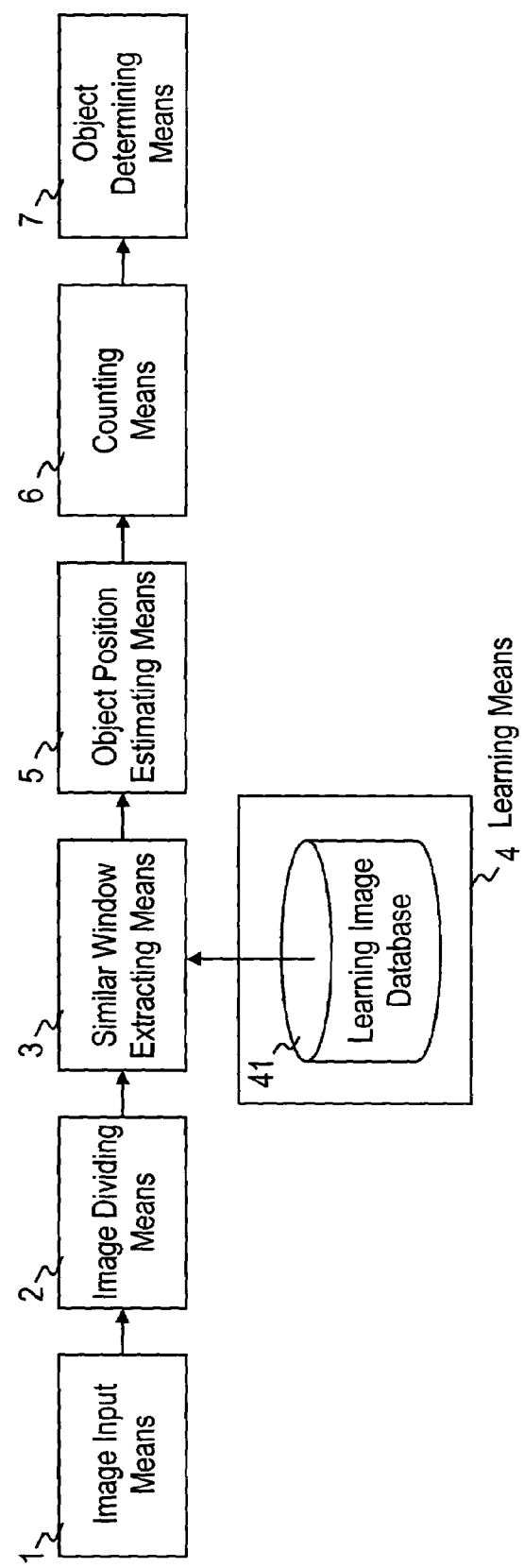
FIG. 1 is a block diagram of an image recognizing apparatus according to Embodiment 1 of the present invention.

FIG. 1 is a block diagram of an image recognizing apparatus according to Embodiment 1 of the present invention. Image input means 1 receives image data of an object to be identified. Image dividing means 2 divides the image received by image input means 1 into input windows as local-segments. Similar window extracting means 3 retrieves, from a database, the data of a learning window which is similar to the local window from image dividing means 2, and releases the learning window with its corresponding local window as the learning-local-segments. Learning means 4 preliminarily generates an image model of the object to be identified. Learning image database 41 divides a learning image, which is a model image of an object to be identified, into windows having the size as the local window from image dividing means 2 and stores them as learning windows. Object position estimating means 5 calculates the position of the object in the input image from the position of the learning window in the learning image retrieved by similar window extracting means 3 and the position of the corresponding local window in the input image. Counting means 6 counts a pair of the local window, which is received from object position estimating means 5, and the learning window for each position which is estimated from the window and the learning window. Object determining means 7 judges whether the object is present or not in the input image and, when so, determines the position of the object in the input image.

Figure 2:
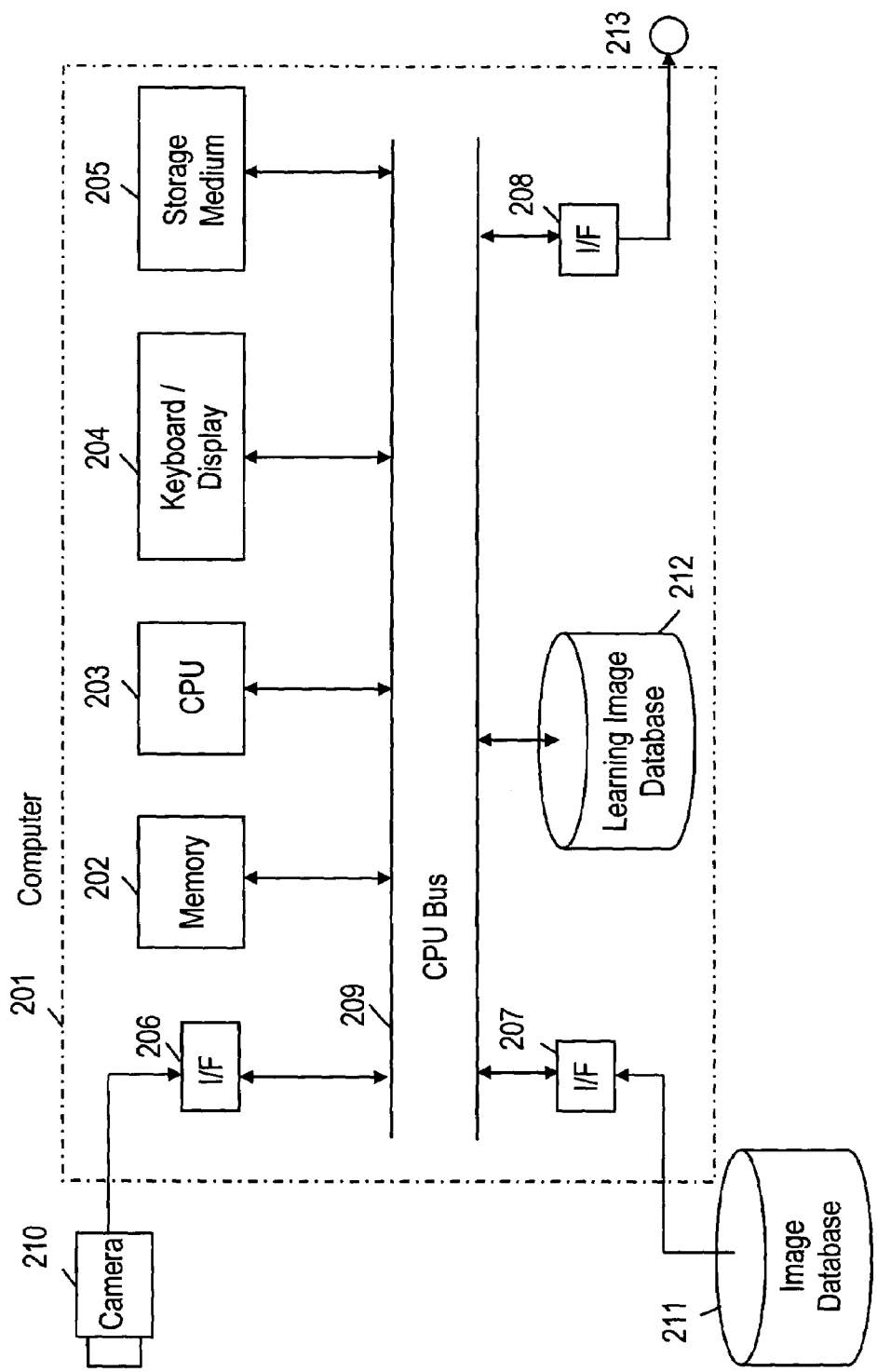
FIG. 2 is a block diagram of the image recognizing apparatus of Embodiment 1 implemented by a computer.

FIG. 2 is a block diagram showing an image recognizing apparatus implemented by a computer. The image recognizing apparatus comprises computer 201, CPU 202, memory 203, keyboard and display 204, storage medium unit 205 such as an FD, a PD, or an MO drive for holding an image recognizing program, interface (I/F) units 206, 207, and 208, CPU bus 209, camera 210 for capturing an image, image database 211 for supplying pre-stored image data, learning image database 212 for dividing the learning image, which is the model image of each object of interest, into a window-sized segment and storing them as learning windows, and output terminal 213 for delivering the type and position of the object via the I/F units.

Figure 3:
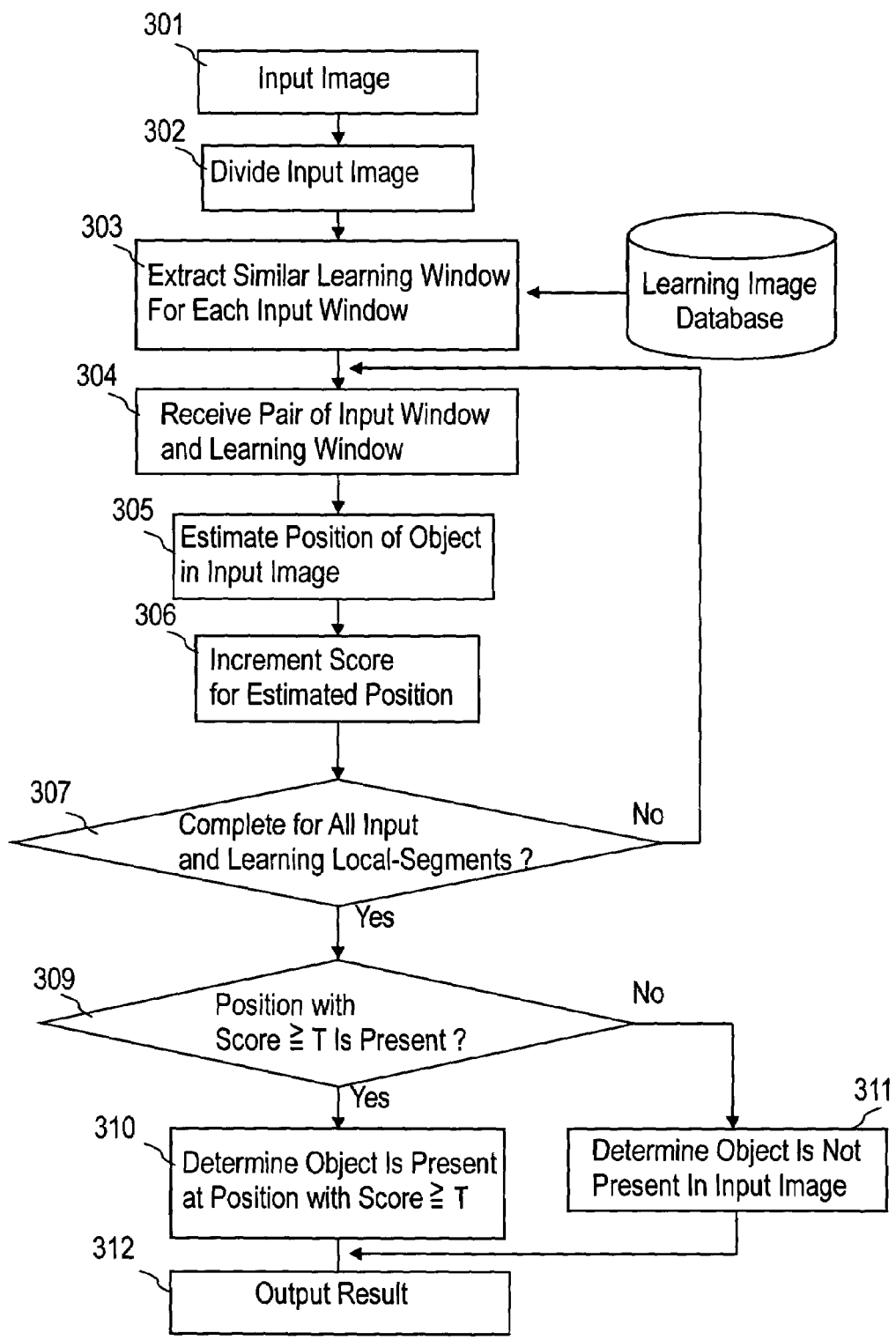
FIG. 3 is a flowchart showing a procedure in Embodiment 1.
Figure 4:
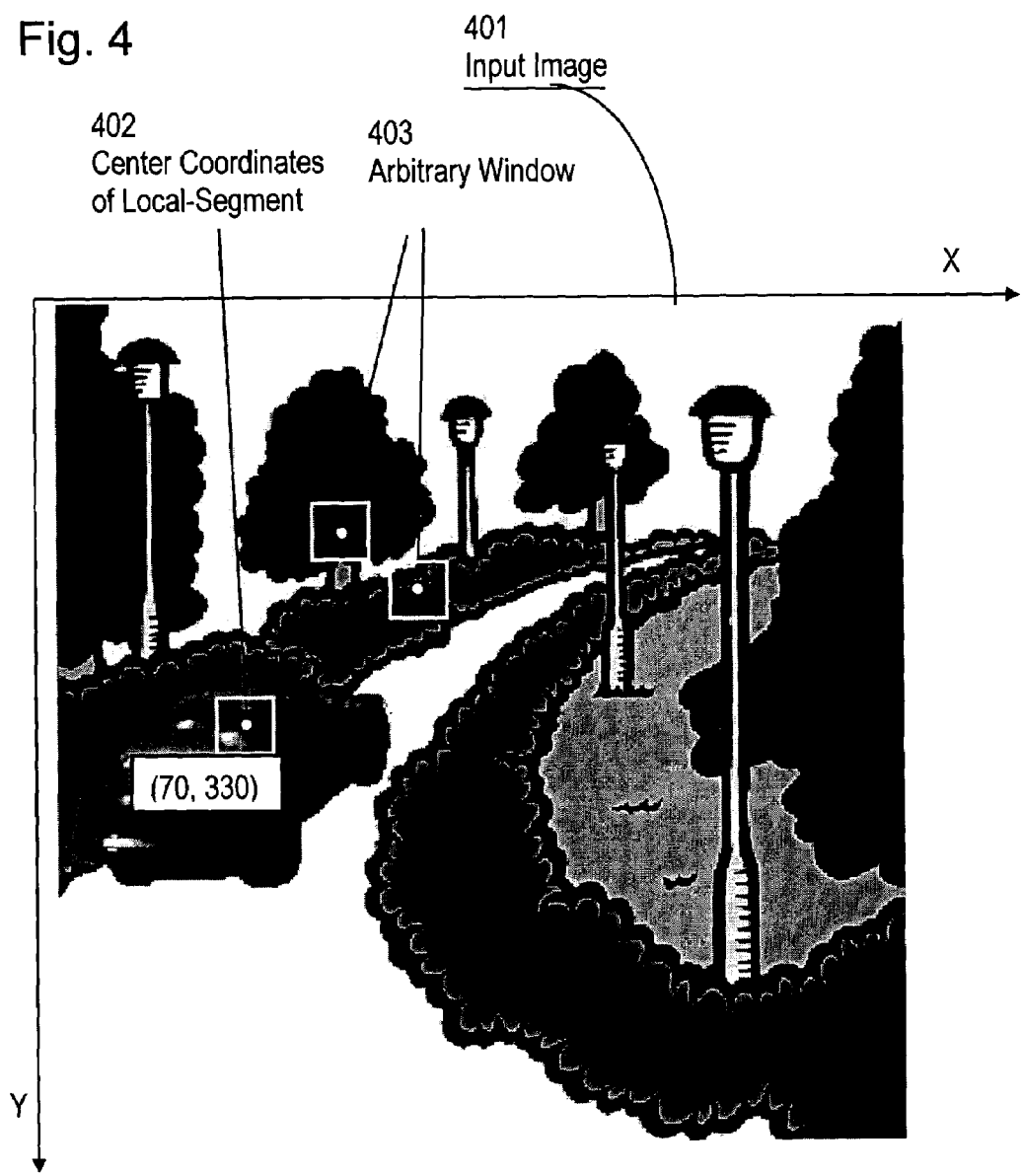
FIG. 4 illustrates an example of input image in Embodiment 1.

The operation of the image recognizing apparatus having the above arrangement is now explained referring to the flowchart shown in FIG. 3. FIG. 4 illustrates an example of the input image, FIG. 5 illustrates examples of the learning image, FIG. 6 illustrates an example of the data output of similar window extracting means 3, and FIG. 7 illustrates an example of the resultant output of counting means 6.

Figure 5:
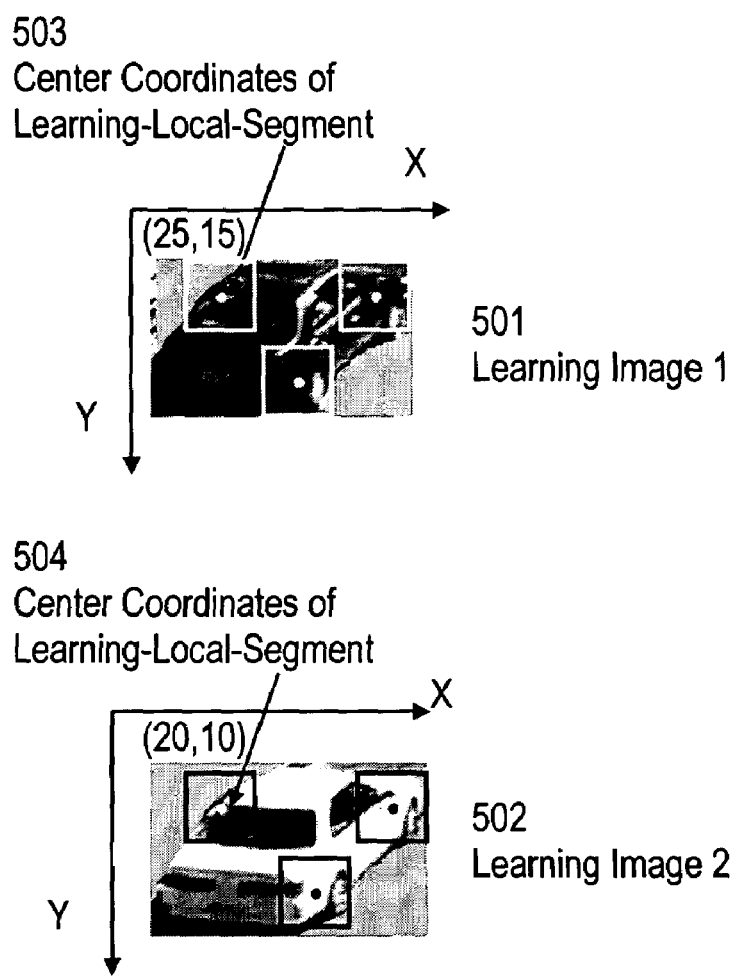
FIG. 5 illustrates examples of learning image data stored in a learning image database of Embodiment 1.

In learning image database 41 (learning image database 212), the same window-size of images of an object to be identified as the input window, shown in FIG. 5, are stored as image data of a learning window together with the coordinate at the center thereof. Learning images 1 and 2 shown in FIG. 5 are provided for identifying a sedan-type vehicle in the shown direction and size.

Image input means 1, which is camera 210 or image database 211, receives an image data of interest (Step 301). Image dividing means 2 retrieves an input window data of a predetermined size from the received image through moving and locating a local window and releases the input local window data with the coordinate at the center thereof (Step 302).

Similar window extracting means 3 calculates a difference between the input local window data in the input image received from image dividing means 2 and the corresponding learning window data stored in learning image database 41 (learning image database 212) (e.g. a sum of squares of a pixel data difference or an accumulation of the absolutes of a pixel data difference) and picks up one of the learning window data with the minimum difference. Picking up the most similar learning window to every input local window in the input image from learning image database 41, similar window extracting means 3 releases the coordinates at the center of the learning window and the coordinates at the center of the corresponding input local window in a combination as shown in FIG. 6 (Step 303).

Object position estimating means 5, upon receiving a pair of the coordinate data of the learning window and the coordinate data of the input local window (Step 304), estimates the position of the object in the input image (more specifically, the coordinates at the upper left corner of a rectangular which circumscribes the object, i.e., at the origin of the learning image shown in FIG. 5) (Step 305). Input the coordinates ($\alpha$, $\beta$) of the input local window shown in FIG. 6 and the coordinates ($\gamma$, $\theta$) of the learning window, object position estimating means releases the position of the object is expressed as ($\alpha$-$\gamma$, $\beta$-$\theta$).

Counting means 6, when receiving the coordinates ($\alpha$-$\gamma$, $\beta$-$\theta$) calculated at Step 305, increments the score for the coordinates by one (Step 306). As a procedure from Step 304 to Step 306 has been repeated for all the pairs of the input local window and the learning window (Step 307), counting means 6 releases a sum data including the coordinates at the position and the score as shown in FIG. 7.

Object image determining means 7 then judges whether or not the score for each set of the coordinates is greater than certain value T (Step 309). When so, it is judged that the object to be identified is present in the input image (Step 310). If none of the scores is greater than certain value T, it is determined that the object to be identified is not present in the input image (Step 311). The coordinates at the position of the object are then passed through I/F unit 208 and released from output terminal 213 (Step 312).

Embodiment 2

Figure 8:
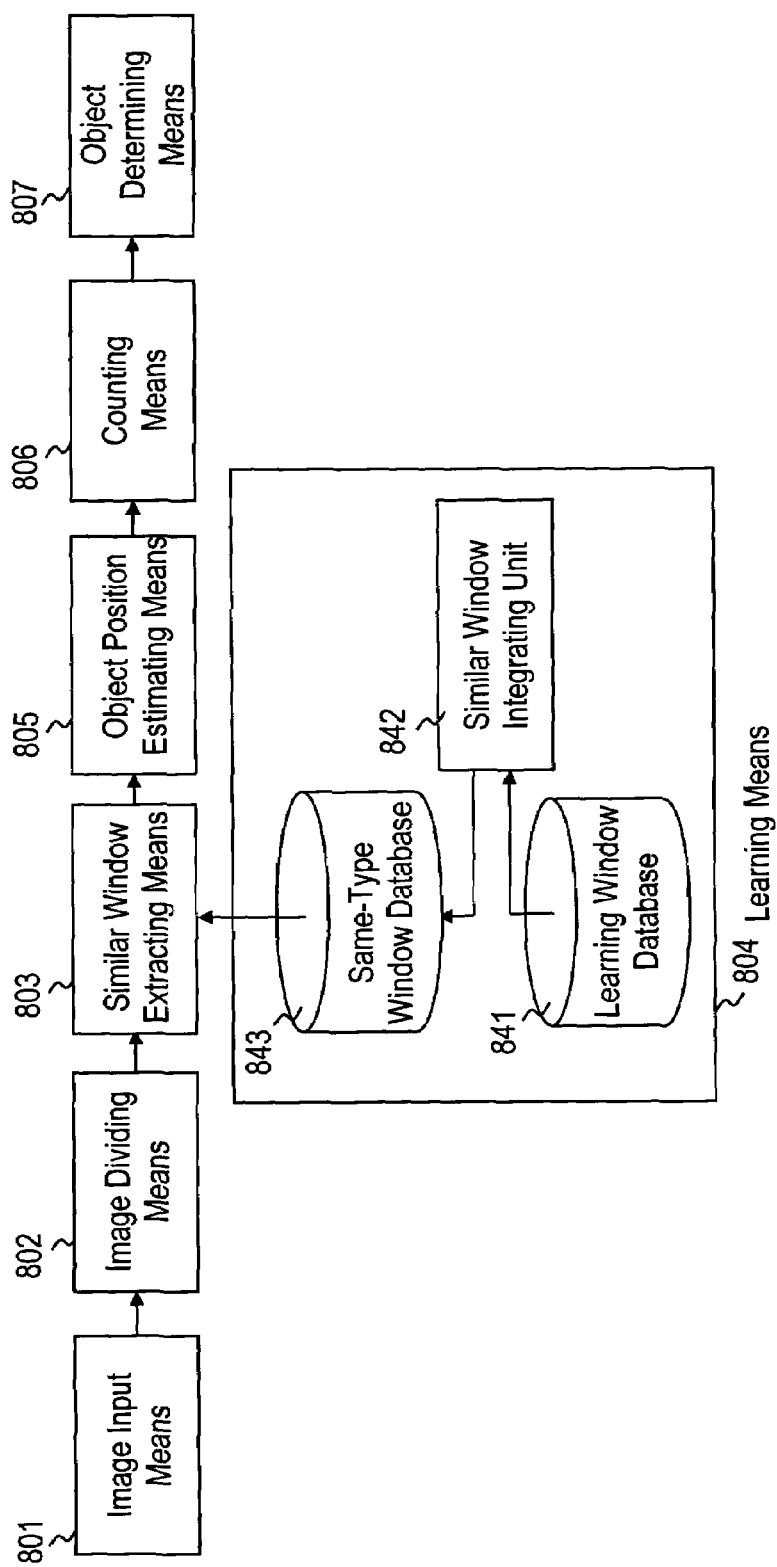
FIG. 8 is a block diagram of an image recognizing apparatus according to Embodiment 2 of the present invention.

FIG. 8 is a block diagram of an image recognizing apparatus according to Embodiment 2 of the present invention. Image input means 801 receives image data of an object to be identified. image dividing means 802 divides the image data supplied from the image input means 801 into an input window as local-segments and releases the input window data. Similar window extracting means 803 retrieves learning window (learning-local-segment) data, which is similar to the input local window data divided by image dividing means 802, from a database and releases it together with the corresponding input local window data. Learning means 804 preliminarily generates a model of the object to be identified. Learning image database 841 divides a learning image, which represents the model of the object to be identified, into learning windows having the same size as the input windows generated by image dividing means 802 and stores the learning windows. Similar window integrating unit 842 makes a group of the learning windows which are stored in learning image database 841 and similar to each other and releases the image data of a representative learning window of the group together with the coordinates of each of the other learning windows in the group. Integrating unit 842 also releases the coordinates and the image data of a learning window which is dissimilar to the other learning windows. Same-type window database 843 stores the coordinates and the image data of the representative learning window of each group received from similar window integrating unit 842. Object position estimating means 805 calculates the position of the object in the input image from the position of the learning window in the learning image retrieved by similar window extracting means 803 and the position of its corresponding input local window in the input image. Counting means 806 counts a pair of the input local window and the learning window for each position which is estimated from the input window and the learning window by object position estimating means, when receiving a result of the counting operation of counting means 806, judges whether or not the object is present in the input image and, if so, determines the position of the object.

Figure 9:
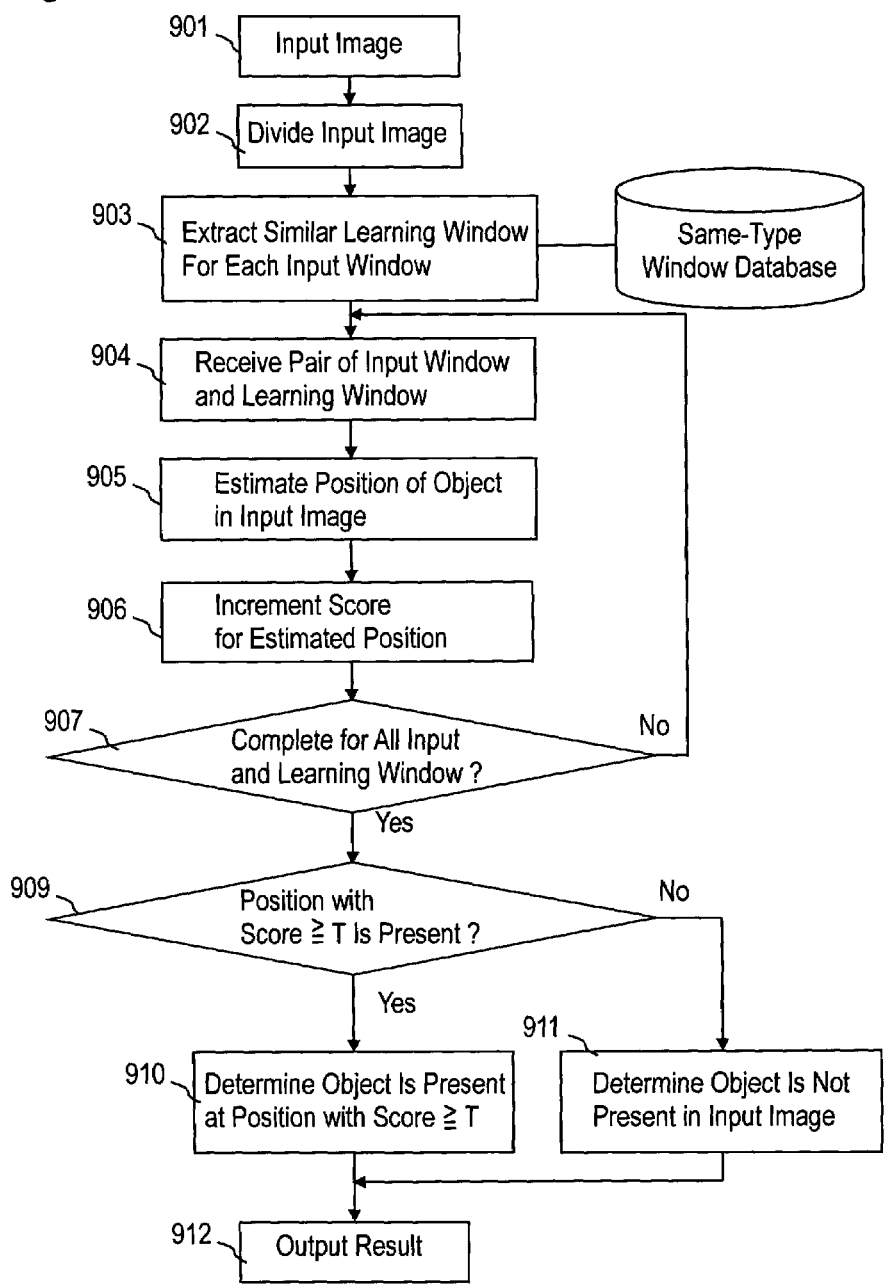
FIG. 9 is a flowchart showing a procedure in Embodiment 2.

The operation of the image recognizing apparatus having the above arrangement is now explained referring to the flowchart shown in FIG. 9.

Figure 10:
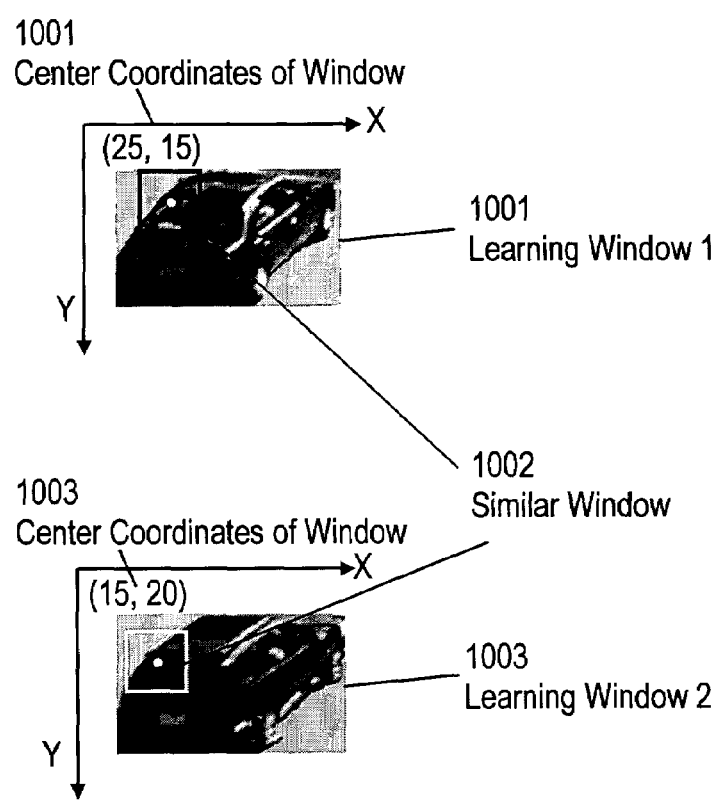
FIG. 10 illustrates examples of same-type images stored in an image database of Embodiment 2.

While the input image is shown in FIG. 4 and the learning images are shown in FIG. 5, FIG. 10 illustrates similar windows stored in similar window database 841, FIG. 11 illustrates examples of same-type window data stored in same-type window database 843, FIG. 12 illustrates a data output of similar window extracting means 803, and FIG. 13 illustrates a resultant output of counting means 806.

The input image of each object to be identified is divided into learning windows having the same size as the input local windows of the input image shown in FIG. 5, and each learning window data is stored together with its window number and the coordinates at the center thereof in learning image database 841. FIG. 5 shows such two learning windows as learning images 1 and 2 for identifying a sedan-type vehicle in the shown direction and size. Same-type window database 843 stores the image data of a representative learning window of each group of the similar windows, such as shown in FIG. 10, and the coordinates of each of the other learning windows in the group, which are retrieved from learning image database 841 by similar window integrating unit 842 as shown in FIG. 11.

Image input means 801 receives image data of interest (Step 901). Image dividing means 802 extracts local windows of a predetermined size from the image data as an input windows and releases their data together with the coordinates at the center thereof (Step 902).

Similar window extracting means 803 calculates a difference between the input local window received from image dividing means 802 and the representative learning window of each group stored in same-type window database 843 (e.g. a sum of the squares of a pixel data difference or an accumulation of the absolutes of a pixel data difference) and picks up a group having the minimum difference from the groups. As picking up a group of the learning windows which are most similar to the corresponding input local windows, similar window extracting means 803 recognizes that all the learning windows in the group are similar (or corresponding) to the input local window. Extracting means 803 retrieves the coordinates of the representative learning local window from same-type window database 843 and releases them together with the coordinates at the center of the input window and those at the center of the learning window and the type of a vehicle attributed to the learning window as shown in FIG. 12 (Step 903).

Object position estimating means 805, upon receiving a pair of the coordinate data of the learning window and the coordinate data of the input local window (Step 904), estimates the position of the object in the input image, and more specifically, the coordinates at the upper left corner of a rectangular which circumscribes the object (i.e., the origin in the learning image shown in FIG. 5), and releases its data together with the type of a vehicle (Step 905). Upon Input the coordinates of the input local window ($\alpha$, $\beta$) and the coordinates of the learning window ($\gamma$, $\theta$) as shown in FIG. 12, object position estimating means 805 releases the position of the object ($\alpha$-$\gamma$, $\beta$-$\theta$).

Counting means 806, when receiving the coordinates ($\alpha$-$\gamma$, $\beta$-$\theta$) calculated at Step 905 together with data of the type of a vehicle, increments both the score for the coordinates and the score for the type of a vehicle by one (Step 906).

It is then examined whether or not the procedure from Step 904 to Step 906 is completed for all the pairs of the input local window and the learning window (Step 907), and when so, counting means 806 delivers the coordinates of the position, the score for it, and the score for each type of a vehicle in a combination, shown in FIG. 13, to object image determining means 807.

Object image determining means 807 then determines whether or not the score for each set of the coordinates is greater than certain value T (Step 909). When so, the coordinates at each position of which score is greater than T and the type of a vehicle of which score is higher than any other scores is released (Step 910). If none of the scores is greater than certain value T, determining means 807 determines the object to be identified is not present in the input image (Step 911). The coordinates at the position and the type of the vehicle of the object are then released from the output terminal 213 through I/F unit 208 (Step 912).

Embodiment 3

Figure 14:
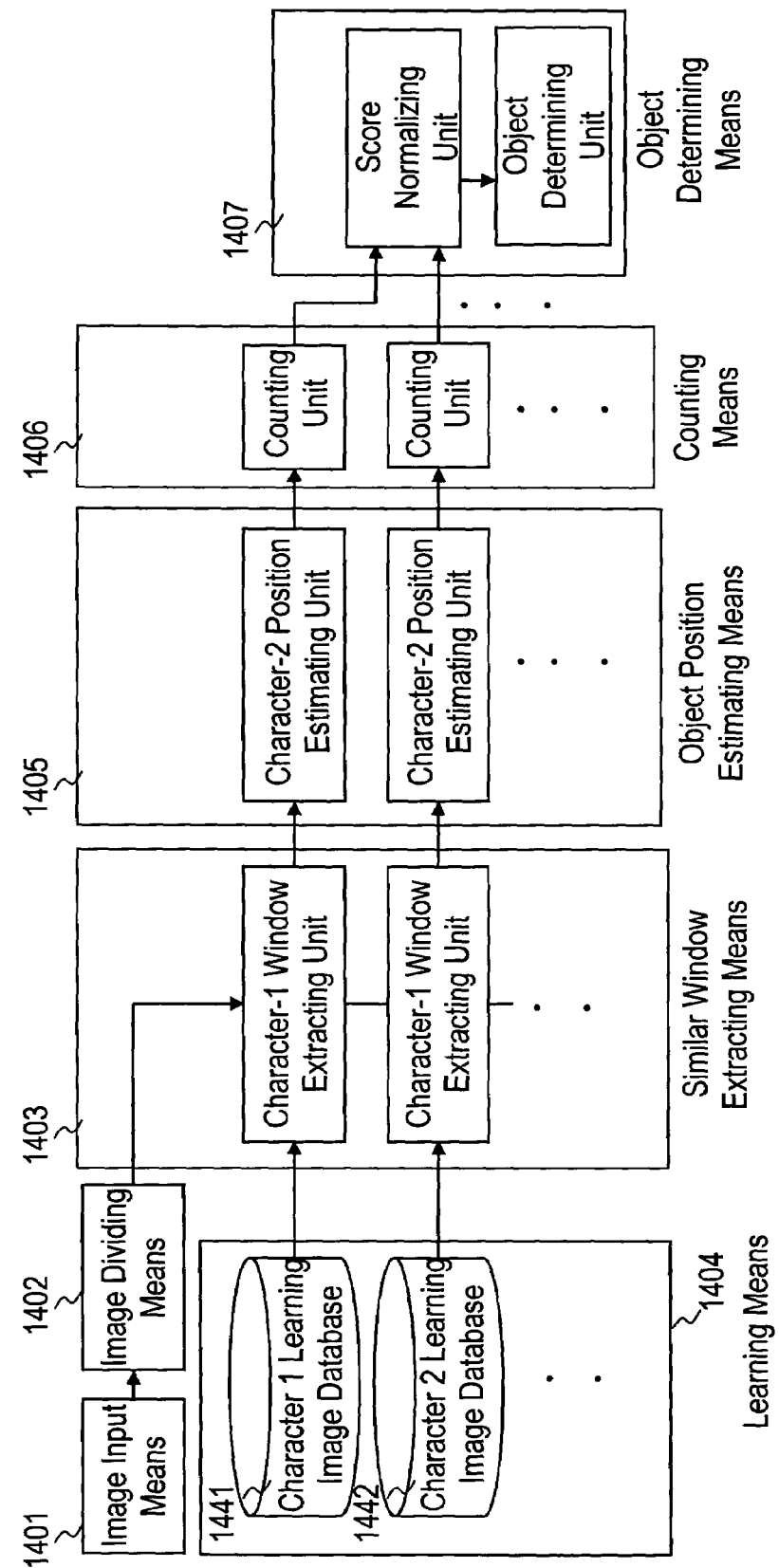
FIG. 14 is a block diagram of an image recognizing apparatus according to Embodiment 3 of the present invention.

FIG. 14 is a block diagram of an image recognizing apparatus according to Embodiment 3 of the present invention. Image input means 1401 receives image data of an object to be identified. Image dividing means 1402 divides the image data supplied from image input means 1401 into input windows as local-segments and releases the input windows. Similar window extracting means 1403 retrieves one similar learning window (learning—local-segment) to each input local window released by image dividing means 1402 from each learning database and releases it together with the corresponding input local window data. Learning means 1404 preliminarily generates a model of the object which corresponds to different categories to be identified. By-character learning image databases 1441, 1442, . . . divide a learning image which represents the model of the object to be identified into learning windows having the same size as the input windows determined by image dividing means 1402, and store the learning windows for each character. Object position estimating means 1405 calculates the position of the object in the input image from the position of the learning window in the learning image retrieved by similar window extracting means 1403 for each character and the position of its corresponding input local window in the input image. Counting means 1406 counts a pair of the input local window and the learning window for each position which is estimated from the input window and the learning window by object position estimating means 1405 for each character. Object determining means 1407, when receiving results of the counting operation of counting means 1406 for each character, judges whether or not the object is present in the input image, and if so, determines the position of the object.

Figure 15:
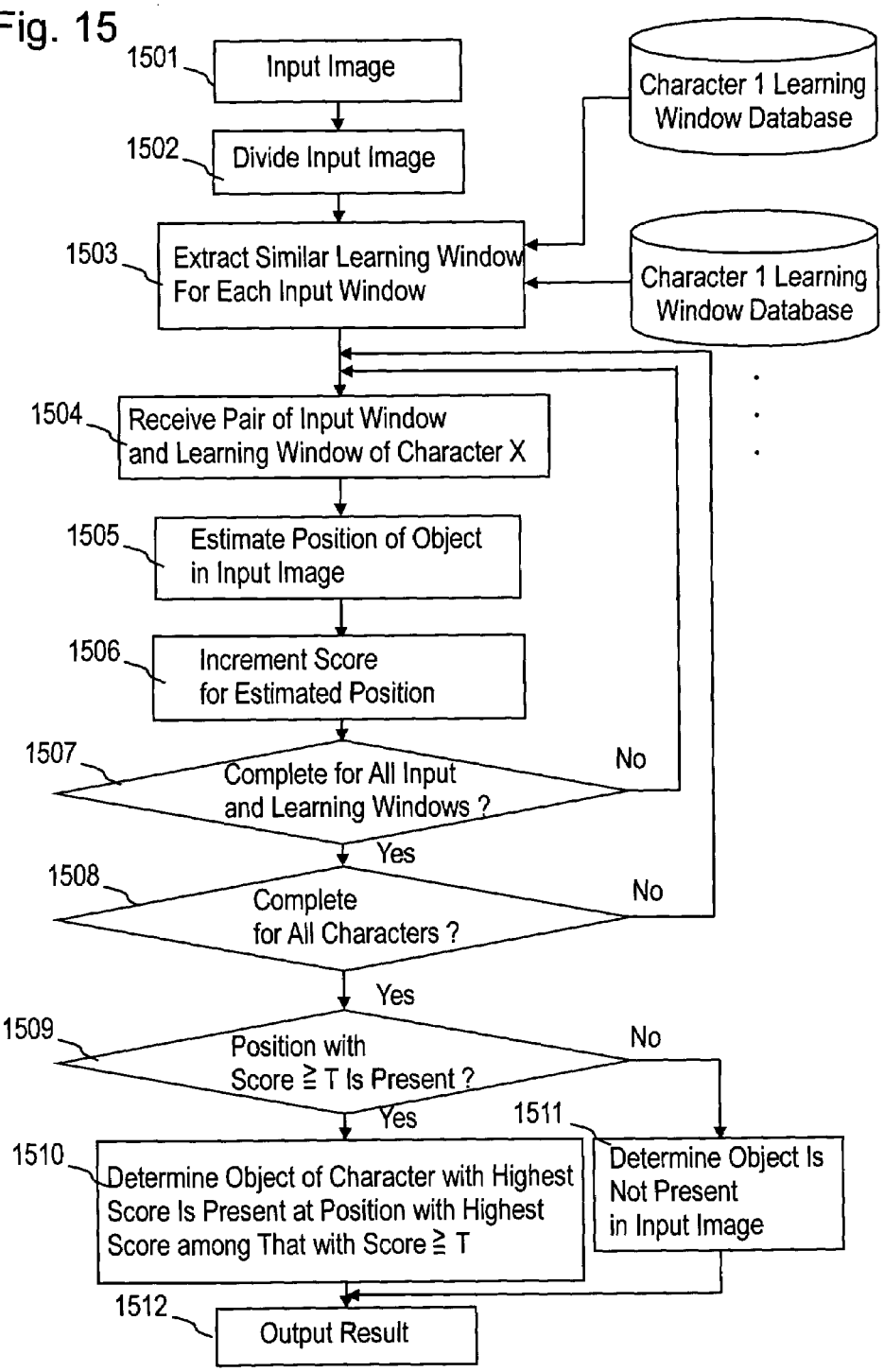
FIG. 15 is a flowchart showing a procedure in Embodiment 3.

The operation of the image recognizing apparatus having the above arrangement is now explained referring to the flowchart shown in FIG. 15.

An input image is shown in FIG. 4, a learning image of character 1 is shown in FIG. 5, an example of output data of similar window extracting means 1403 is shown in FIG. 6, and the learning image of character 2 is shown in FIG. 16.

In each of by-character learning image databases 1441, 1442, . . . in learning means 1404, the image of the object to be identified of each character is divided into learning windows having the same size as the input windows of the input image shown in FIG. 5, and the learning windows are stored together with the window numbers and the coordinates at the center thereof. FIG. 5 shows such learning windows stored in character-1 learning image database 1441. Two learning images 1 and 2 are for identifying sedan-type vehicles in the shown direction and size. The learning images shown in FIG. 16 are stored in character 2 learning image database 1442 for identifying buses in the same location and direction as shown in FIG. 5.

Image input means 1401 receives image data of interest (Step 1501). Image dividing means 1402 extracts a input windows from the image data through moving and locating a window of predetermined size and releases the input window together with the coordinates at the center thereof (Step 1502).

Similar window extracting means 1403 calculates a difference between the input local window of the input image received from image dividing means 1402 and its corresponding learning window stored in each by-character learning image database in learning means 1404 (e.g. a sum of the squares of a pixel data difference or an accumulation of the absolutes of a pixel data difference), and picks up the learning window having the minimum difference in each learning image database. Similar window extracting means 1403 picks up the most similar learning window for each input window from learning means 1404. Extracting means 1403 retrieves and releases the coordinates at the center of the learning window together with the coordinates at the center of the corresponding input window for each character as shown in FIG. 6 (Step 1503).

Object position estimating means 1405, upon receiving a pair of the coordinate data of the learning window and the coordinate data of the input local window (Step 1504), estimates the position of the object in the input image, e.g., the coordinates at the upper left corner of the rectangular which circumscribes the object (i.e., the origin in the learning image shown in FIG. 5) (Step 1505). Upon input the coordinates ($\alpha$, $\beta$) of the input local window and the coordinates ($\gamma$, $\theta$) of the learning window as shown in FIG. 6, object position estimating means 1405 releases the position ($\alpha$-$\gamma$, $\beta$-$\theta$) of the object.

Counting means 1406, when receiving the coordinates ($\alpha$-$\gamma$, $\beta$-$\theta$) calculated at Step 1505, increments the score for the coordinates of the window by one for each character (Step 1506).

It is then examined whether or not the procedure from Step 1504 to Step 1506 is completed for all the pairs of the input local window and the learning window for one character (Step 1507). The same procedure from Step 1504 to Step 1506 is repeated for another character. When the procedure has been completed for all the learning windows and the input local windows for all characters, counting means 1406 delivers the coordinates of the position and the score in a combination for each character shown in FIG. 7 to object image determining means 1407 (Step 1508).

Object image determining means 1407 then determines whether or not the score for each set of the coordinates is greater than certain value T (Step 1509). When object image determining means 1407 determines that the object of a particular character of which score is greater than T and higher than any other scores is present in the input image, the coordinates at the position of the object are released together with data of the character (Step 1510). If none of the scores is greater than certain value T, determining means 1407 determines that the object to be identified is not present in the input image (Step 1511). The coordinates at the position and the type of the object are released from output terminal 213 through I/F unit 208 (Step 1512).

Embodiment 4

Figure 17:
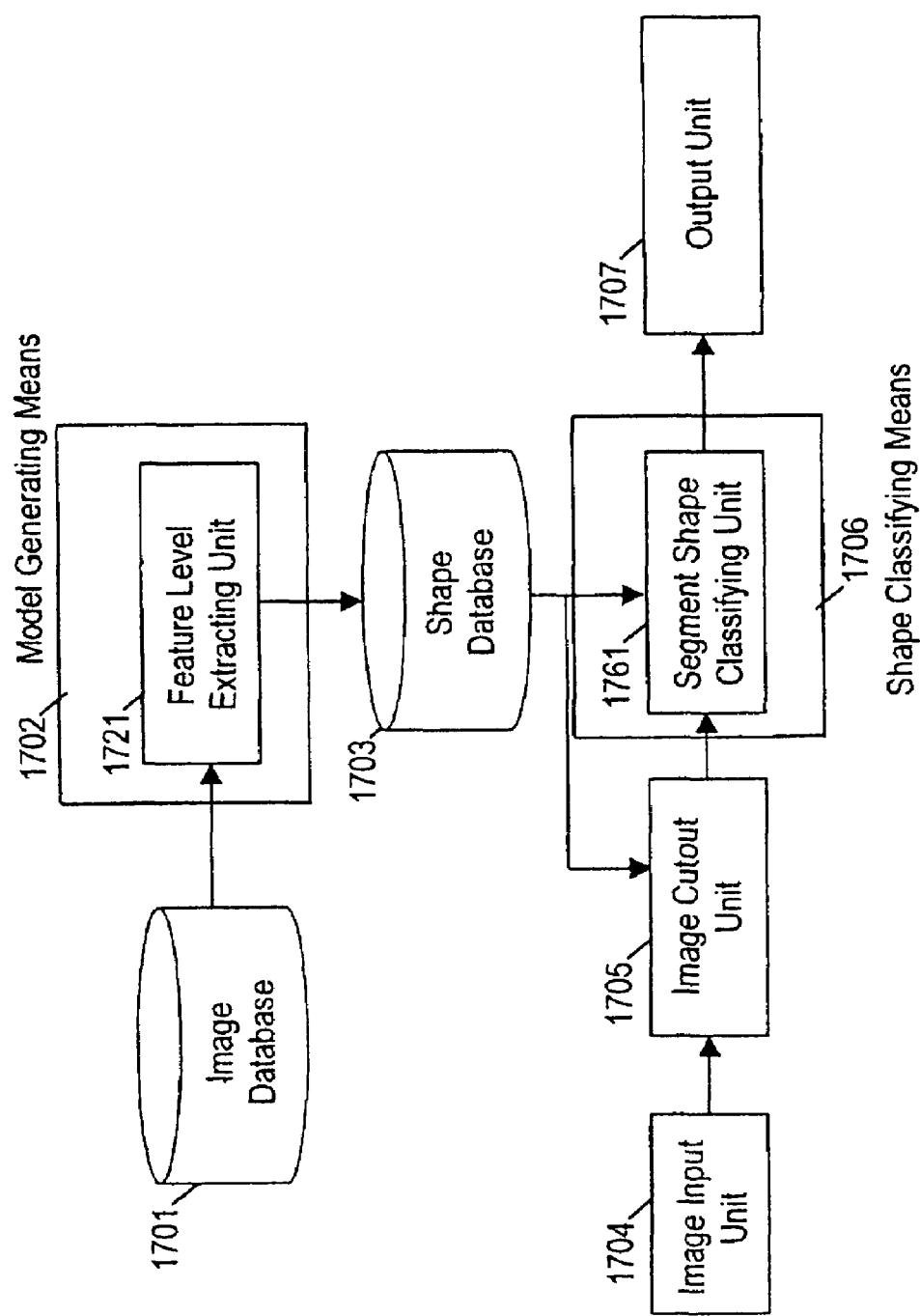
FIG. 17 is a block diagram of an image recognizing apparatus according to Embodiment 4 of the present invention.

FIG. 17 is a block diagram of an image recognizing apparatus according to Embodiment 4 of the present invention.

Image database 1701 stores gradation images of objects having a common shape to be identified, and each gradation image is accompanied with a shape identifier including a shape name, a file name, and the coordinates at the upper left and the lower right corners of a rectangular which circumscribes the object in an image. Model generating means 1702 retrieves all the gradation images of each shape to be identified from image database 1701 and extracts its characteristic. Characteristic level extracting unit 1721 calculates an average and a variance of each pixel in the rectangular which circumscribes the object of each shape in all the gradation images received from image database 1701 and releases them together with the corresponding shape identifier. Shape database 1703 receives and stores each set of the average, the variance, and the shape identifier of each shape from characteristic level extracting unit 1721. Image input unit 1704 inputs an image to be determined whether the object having a shape to be identified is present therein. Image cutout unit 1705 receives the shape identifier from shape database 1703, and cuts out an image segment having the same size as the shape to be identified from the input image. Shape classifying means 1706 examines whether or not an object of the shape to be identified is present in the image segment received from image cutout unit 1705. Segment shape classifying unit 1761 compares the image segment received from image cutout unit 1705 with a shape characteristic retrieved from shape database 1703 for determining that a shape in the image segment coincides with the shape characteristic. Output unit 1707, when receiving an output of the shape classifying means 1706 indicating that the object of the shape to be identified is present in the image segment, directs a display to display the shape and the position of the object in the input image.

Figure 18:
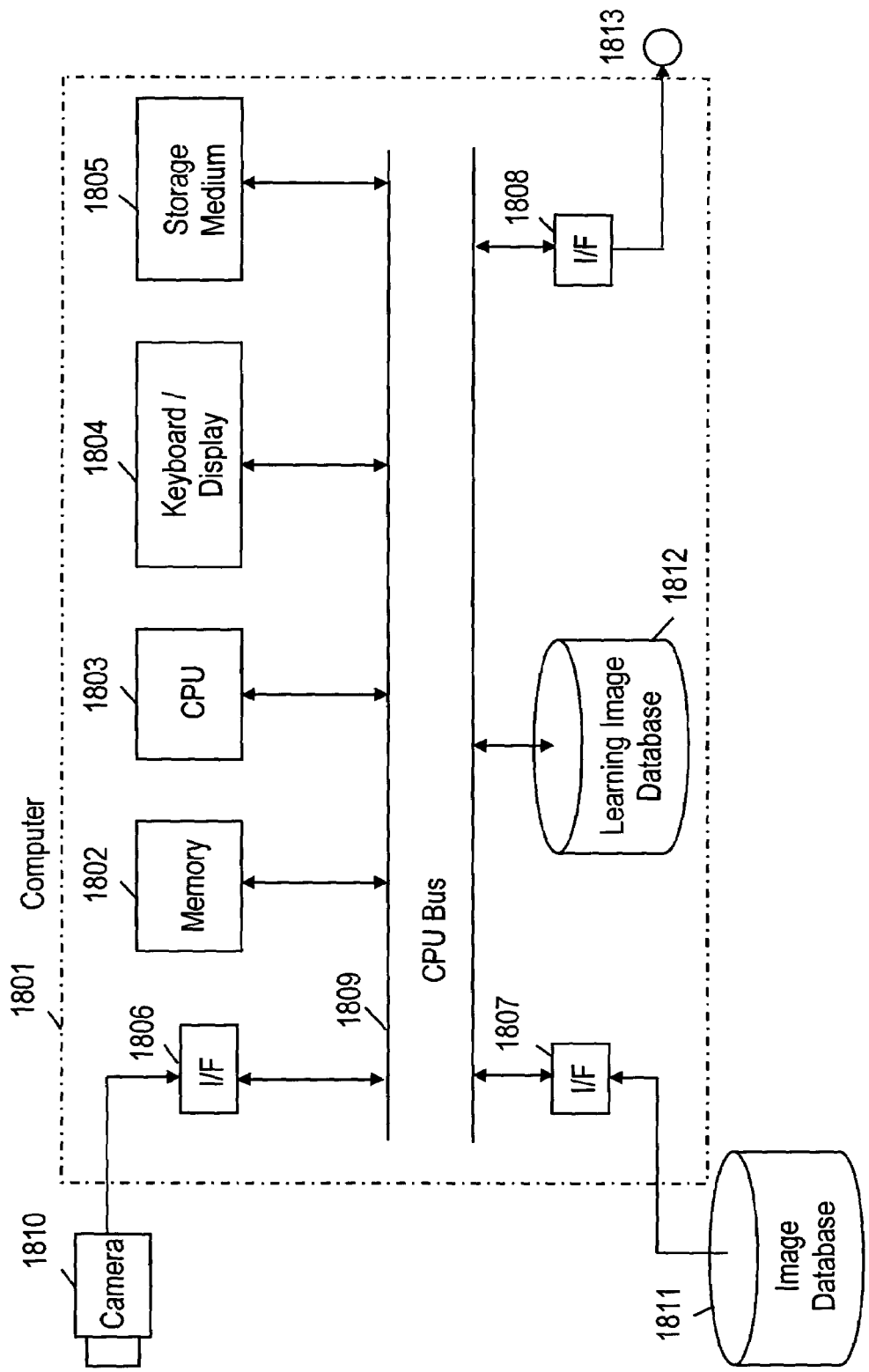
FIG. 18 is a block diagram of the image recognizing apparatus of Embodiment 4 implemented by a computer.

FIG. 18 is a block diagram of an image recognizing apparatus implemented by a computer. The image recognizing apparatus comprises computer 1801, CPU 1802, memory 1803, keyboard and display 1804, storage medium unit 1805 such as an FD, a PD, an MO, a DVD or the like for storing an image recognizing program, interface (I/F) units 1806, 1807, and 1808, CPU bus 1809, camera 1810 for capturing an image, image database 1811 for supplying pre-stored image data, shape database 1812 storing model images of objects of various shapes together with their corresponding shape identifiers, and output terminal 1813 for delivering the shape and the position of the object identified via the I/F units.

Figure 19:
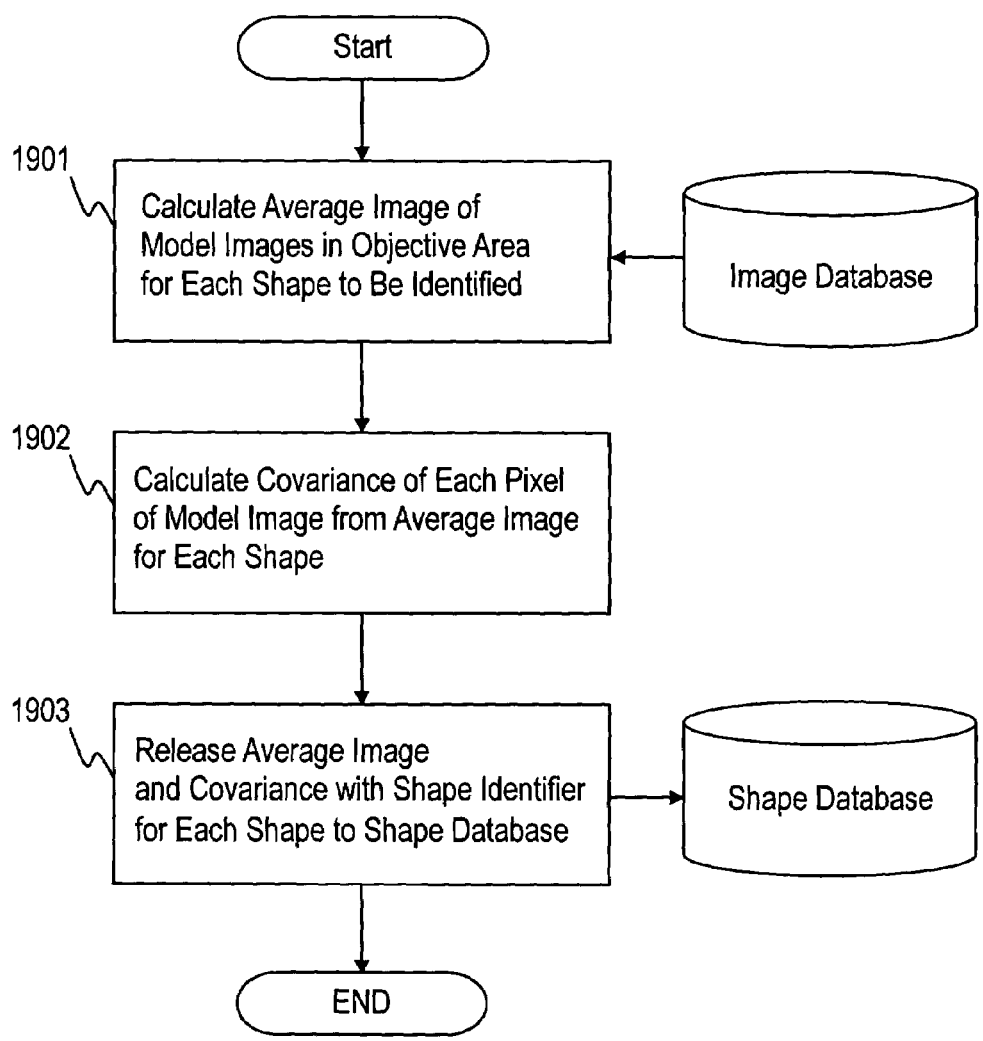
FIG. 19 is a flowchart showing a procedure of the operation of model generating means of Embodiment 4.
Figure 20:
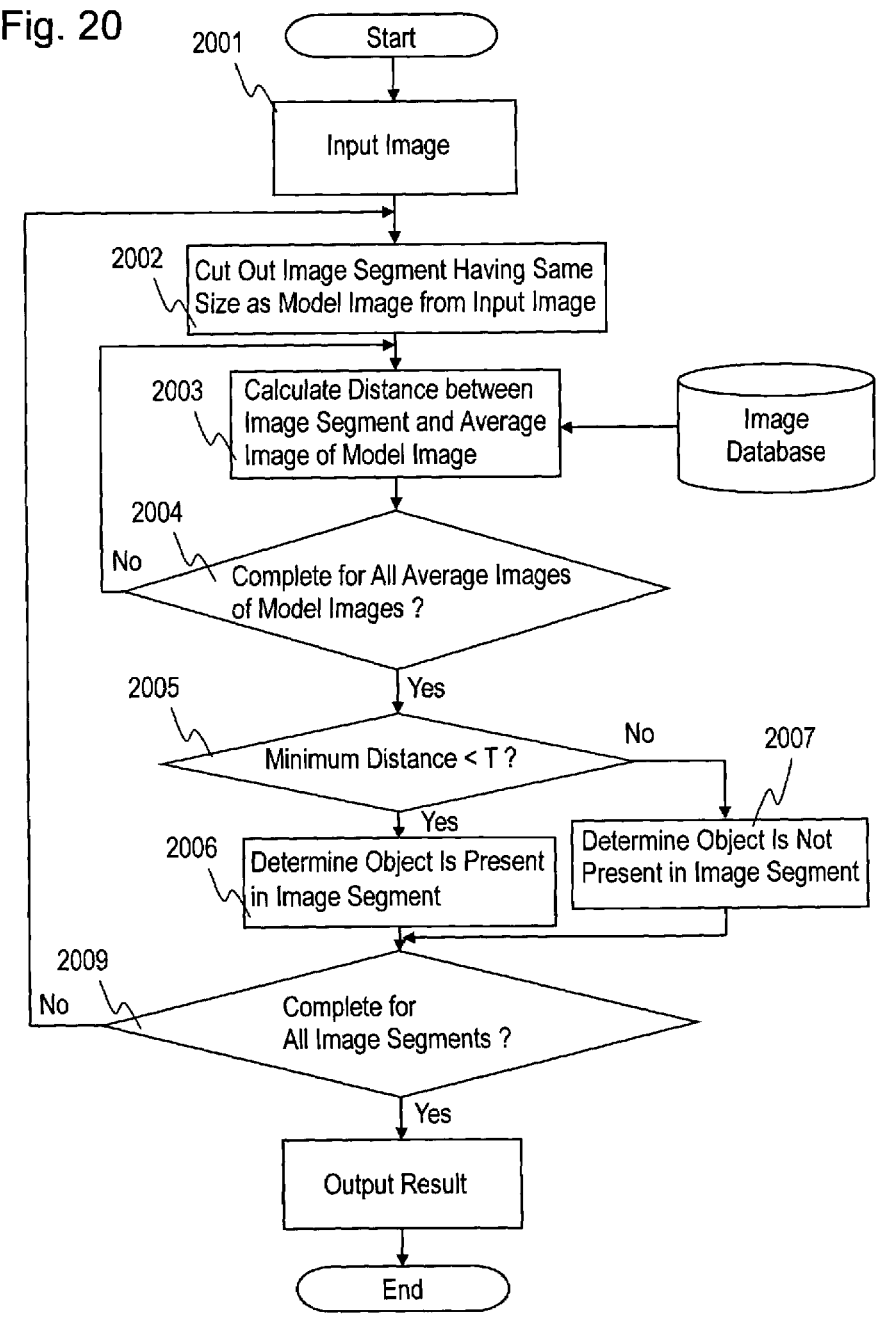
FIG. 20 is a flowchart showing a procedure at an image input unit through an output unit in Embodiment 4.
Figure 23:
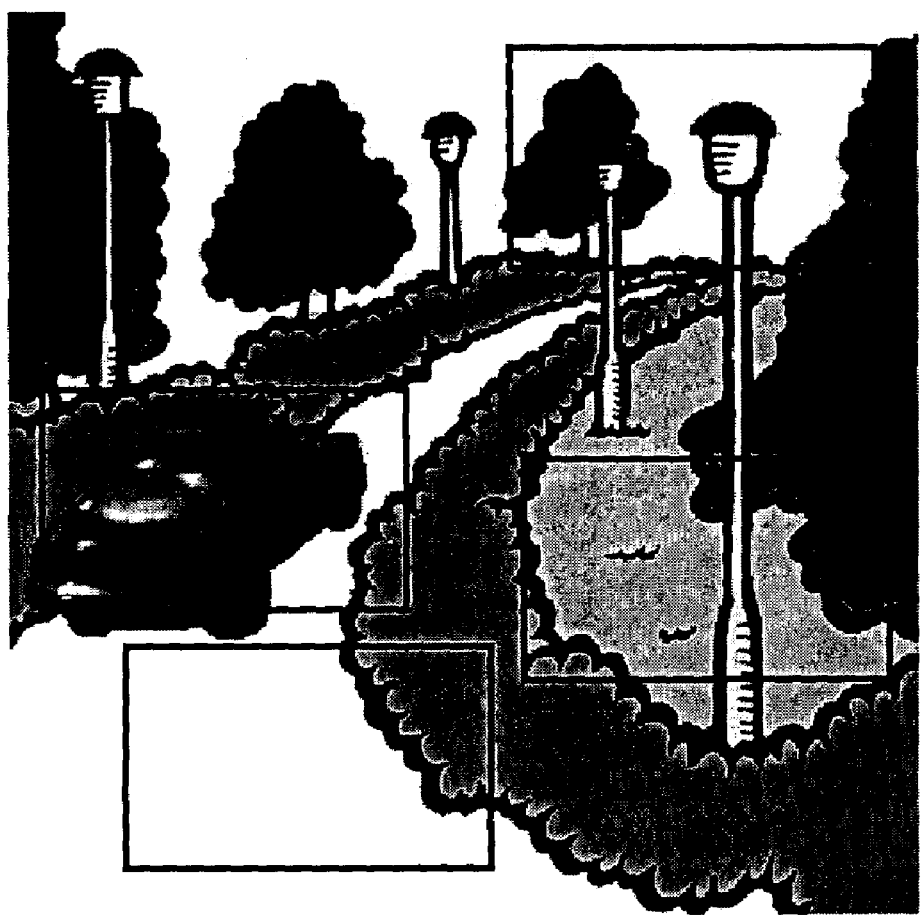
FIG. 23 illustrates examples of rectangular segments cut out by an image cutout unit.
Figure 24:
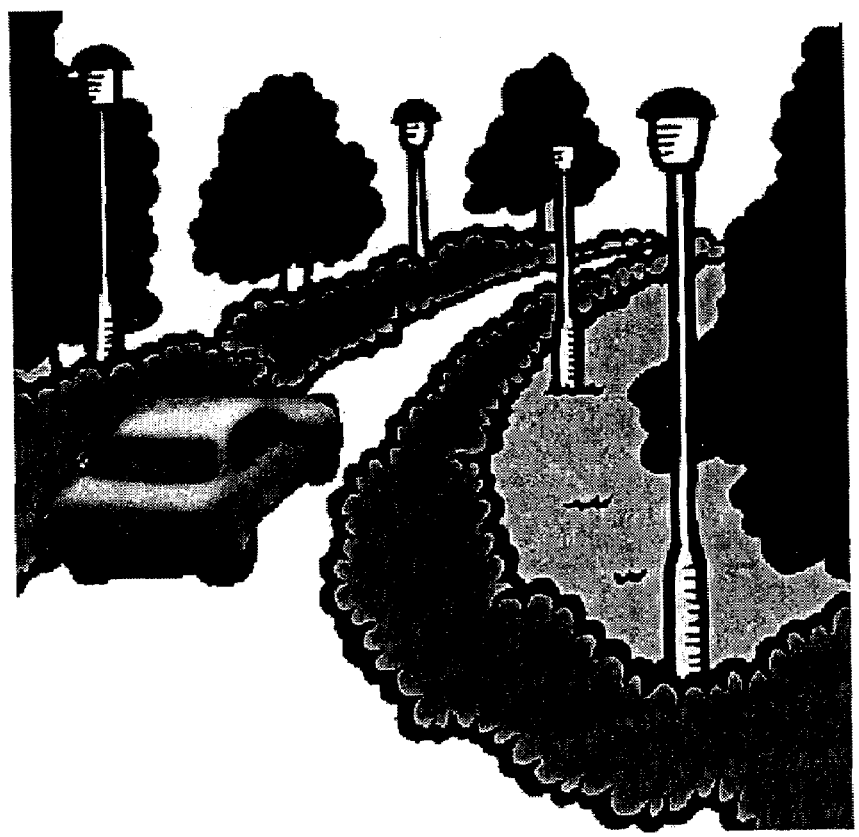
FIG. 24 illustrates an example of a detection result released by an output unit.

The operation of the image recognizing apparatus having the above arrangement is now explained referring to the flowcharts shown in FIGS. 19 and 20. FIG. 19 is the flowchart showing an operation of the model generating means. FIG. 20 is the flowchart showing a procedure from inputting an image data to be examined to outputting a result of recognition. FIG. 21 illustrates examples of the model image stored in image database 1701. FIG. 22 illustrates an example of the average data of one shape with its shape identifier stored in shape database 1703. FIG. 23 illustrates an input image received from image input unit 1704 and includes rectangular image segments cut out by image cutout unit 1705. FIG. 24 illustrates a resultant output of shape classifying means 1706 displayed on the display with output unit 1707.

Prior to recognition, data about the shapes to be identified are prepared. Image database 1701 stores gradation images of various objects such as shown in FIG. 21 in the form of files as a model image. Each image is accompanied with a shape identifier including the shape image, an image file name, and the coordinates at the upper left and the lower right corners of a rectangular which circumscribes the object as an object area. The model images shown in FIG. 21 illustrate different sedan-type vehicles captured from the common angle and distance by a camera.

When a "sedan A"-type vehicle such as shown in FIG. 21 is an object of a shape to be identified, model generating means 1702 retrieves all model images accompanied with a shape identifier including the shape name of "sedan A" from image database 1701 together with the shape identifier. Then, characteristic level extracting unit 1721 calculates an average image of rectangular sized images determined as objective areas (Step 1901). As the model images carry objects of the same shape, their cutout image segments as the objective areas are equal in the size and the average image is also identical in the size.

The average image of "sedan A" shown in FIG. 21 consists of 148 pixels in horizontal by 88 pixel in vertical. Then, characteristic level extracting unit 1721 calculates a variance from the pixel in the rectangular as the objective area and the corresponding pixel of the average image for each model image (Step 1902).

Finally, characteristic level extracting unit 1721 releases the average image of "sedan A", the variance for each pixel, and the corresponding shape identifier, then, shape database 1703 stores them (Step 1903). In case that a plurality of objects of shapes to be identified are provided, the procedure from Step 1901 to Step 1903 is repeated for examining the respective shapes.

For recognition of the "sedan A"-type vehicle, image input unit 1704 (camera 210 or image database 211) supplies an input image (Step 2001). Image cutout unit 1705 cuts out, from the input image, each image segment which is equal in the size to the average image of "sedan A" stored in shape database 1703 through moving the rectangular window having the same size as the average image as shown in FIG. 23 (Step 2002).

Shape classifying means 1706 receives one image segment from image cutout unit 1705 and the average image of "sedan A" and the variance from shape database 1703. Segment shape classifying unit 1761 calculates the square of a difference between each pixel of the image segment and the corresponding pixel of the average image, divides the square by the variance, and calculates a sum of the quotients to determine the distance between the image segment and the average image (Step 2003). In case that the objects of shapes to be identified are two or more, segment shape classifying unit 1761 repeats the operation of Step 2003 for each shape (Step 2004). When the least calculated distances is less than a certain value (Step 2005), it is judged that the image segment contains an object of the shape of the average image which is pertinent to the least distance (Step 2006).

Segment shape classifying unit 1761 judges that no object is present in the image segment when the least distance is not less than the certain value (Step 2007). The above operation is repeated by segment shape classifying unit 1761 for each segment image separated from the input image (Step 2008). When it is judged that the image segment contains the object, output unit 1707 places the shape of the object over the segment image in the input image as shown in FIG. 24 (Step 2009). A resultant image is then released via I/F unit 1808 from output terminal 813.

Embodiment 5

Figure 25:
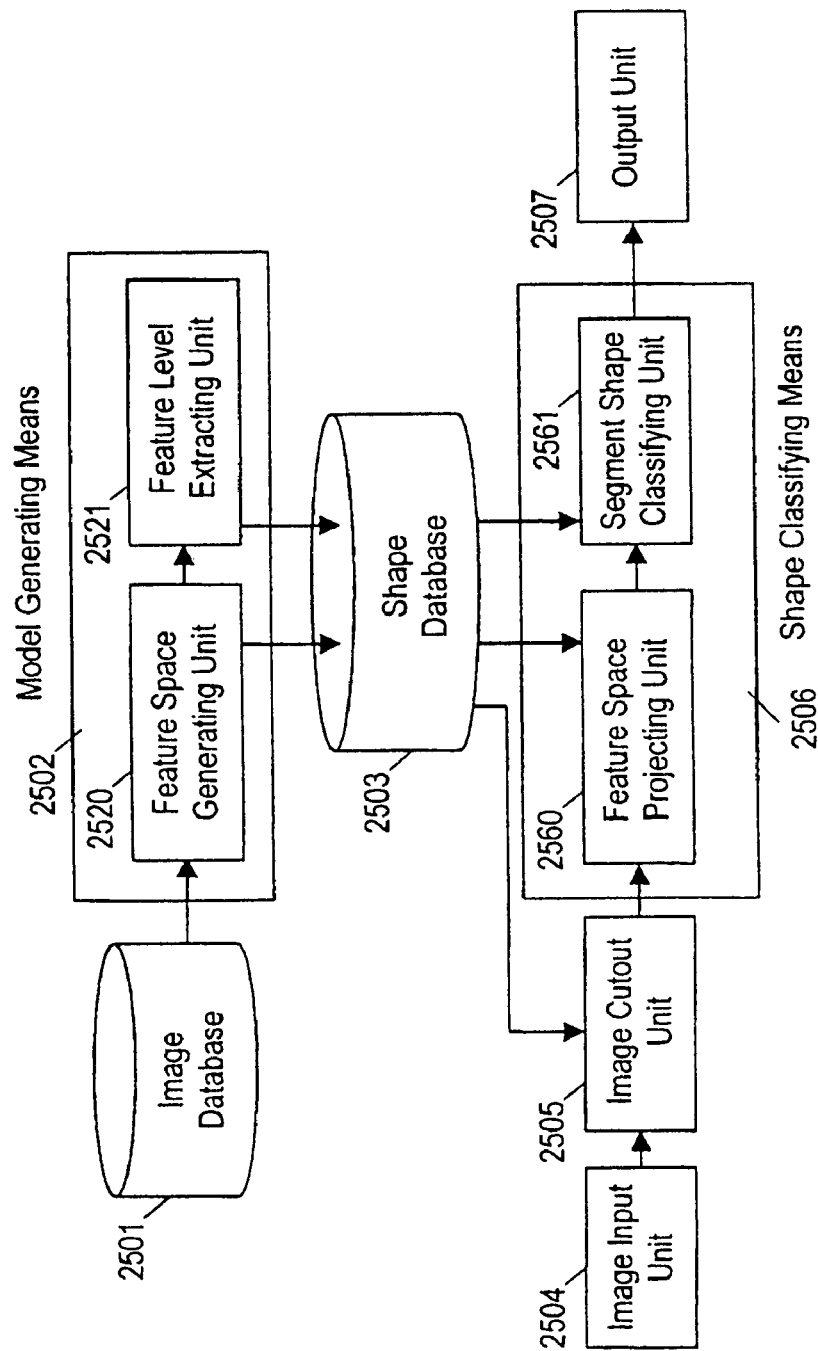
FIG. 25 is a block diagram of an image recognizing apparatus according to Embodiment 5 of the present invention.

FIG. 25 is a block diagram of an image recognizing apparatus according to Embodiment 5 of the present invention.

Image database 2501 stores gradation images of various objects of shapes to be identified. Database 2501 also stores a shape identifier specifying the name of each shape, the image file name, and the coordinates at the upper left and the lower right corners of a rectangular of a predetermined size which circumscribes the object of the shape to be identified. Model generating means 2502 retrieves all the gradation images of each shape of the object to be identified from image database 2501 and extracts the characteristic of the images. Characteristic space generating unit 2520 generates a characteristic space from the model images received from image database 2501 and transfers its base vector to shape database 2503 where each model image is projected to the characteristic space as a model image vector. Characteristic level extracting unit 2521 calculates an average and a variance of all the model image vectors of the shapes received from characteristic space generating unit 2502 for each shape and releases them together with the relevant shape identifier. Shape database 2503 receives and stores the base vector in the characteristic space from characteristic space generating unit 2520 and the average and variance of the model image vectors of each shape with the shape identifier from characteristic level extracting unit 2521. Image input unit 2504 supplies an image to be determined whether the object of a shape to be identified is present therein. Image cutout unit 2505 is responsive to the shape identifier from shape database 2503 for cutting out a segment image, which is equal in the size to the shape to be identified, from the input image. Shape classifying means 2506 examines whether or not an object of the shape to be identified is present in the image segment received from image cutout unit 2505. Characteristic space projecting unit 2560 projects, to the characteristic space, the image segment received from image cutout unit 2505 as an image segment vector based on the base vector received from shape database 2503. Segment shape classifying unit 2561 calculates a distance between the segment image vector received from characteristic space projecting unit 2560 and the average of model shape vectors retrieved from shape database 2503, and classifying unit 2561 determines whether or not the image segment coincides the shape to be identified. Output unit 2507, when receiving an output of the shape classifying means 2506 indicating that the object of the shape to be identified is present in the image segment, display the shape and the position of the object in the image segment on a display.

Figure 26:
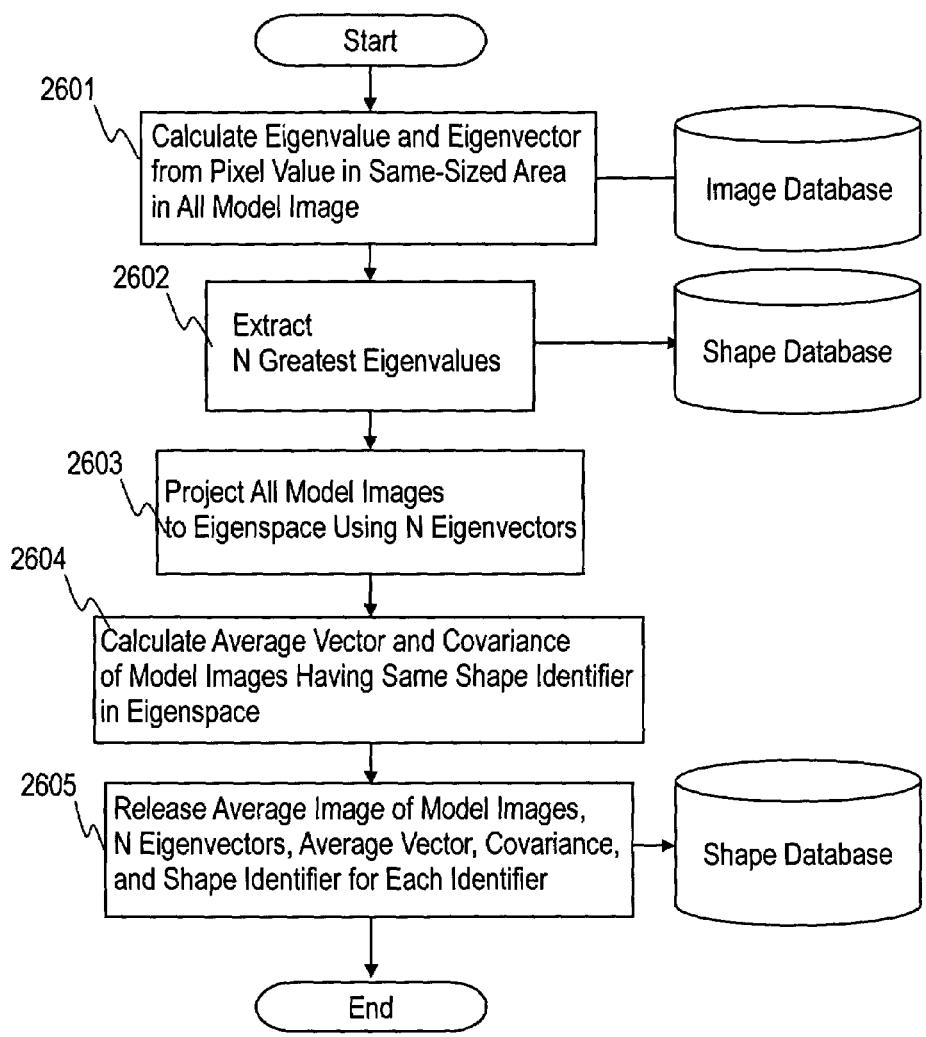
FIG. 26 is a flowchart showing a procedure of the operation at model generating means of Embodiment 5.
Figure 27:
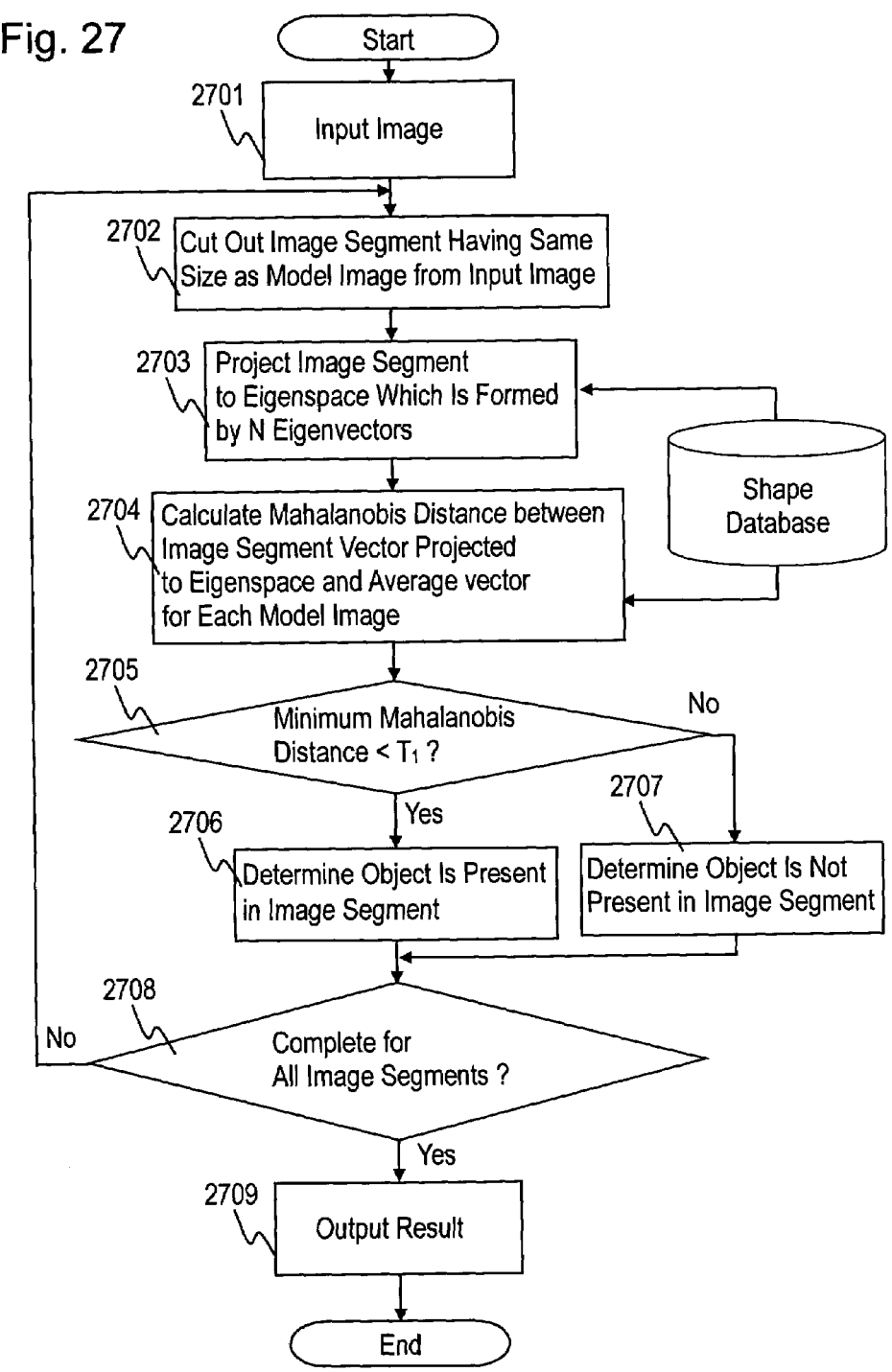
FIG. 27 is a flowchart showing a procedure of an operation at an image input unit through an output unit in Embodiment 5.

The operation of the image recognizing apparatus having the above arrangement is now explained referring to the flowcharts shown in FIGS. 26 and 27. FIG. 26 is the flowchart showing an operation of the model generating means. FIG. 27 is the flowchart showing a procedure from inputting an image to be examined through outputting a result of recognition. FIG. 28 illustrates examples of the model image stored in image database 2501. FIG. 23 illustrates an example of a rectangular segment image which is cut out by image cutout unit 2505 from an input image received from image input unit 2504. FIG. 24 illustrates a resultant output of shape classifying means 2506 displayed on the display.

Prior to recognition, databases about the shapes to be identified are prepared. Image database 2501 stores gradation images of various objects in the form of files such as model images as shown in FIG. 28. Each image is accompanied with the shape identifier specifying a shape of an object, an image file name, and the coordinates at the upper left and the lower right corners of a rectangular which circumscribes the object as an image area. The model images shown in FIG. 28 show a sedan-type vehicle and a bus captured from the common angle and distance by a camera.

When the "sedan A"-type vehicle and the bus shown in FIG. 28 are the objects of the shapes to be identified, model generating means 2502 retrieves all the model images of vehicles accompanied with the shape identifier specifying the shape name of "sedan A" and all the model images accompanied with the shape identifier specifying the shape name of "bus rear portion" from image database 2501 and transfers them to characteristic space generating unit 2520 together with the shape identifiers.

Characteristic space generating unit 2520 calculates an eigenvalue and an eigenvector from the pixel in the rectangular area in the model image (Step 2601). The rectangular areas in each model image are equal in the size, each consisting of 148 pixels in horizontal by 88 pixels in vertical as shown in FIG. 28. For the bus, the rectangular shape shown in FIG. 28 is an objective area at the same position for all the model images of buses. A vector formed as a row of all the pixels in each model image is generated, and an average vector of the vectors is calculated and subtracted from each vector for determining the eigenvalue and an eigenspace.

Characteristic space generating unit 2520 stores the eigenvectors corresponding to the N greatest eigenvalues as base vector in shape database 2503 (Step 2602). Using the N eigenvalues, generating unit 2520 projects each model image as a model image vector in the characteristic space (Step 2603).

Characteristic level extracting unit 2521 receives the model image vector with its shape identifier from characteristic space generating unit 2520 and calculates an average and a covariance of the model image vectors having the same shape identifier (Step 2604). Characteristic level extracting unit 2521 releases the average of the model images and the average and the covariance of model image vectors of each shape together with their corresponding shape identifiers and shape database 2503 stores them (Step 2605).

For the recognition, an image to be identified is supplied from image input unit 2504 (Step 2701). Image cutout unit 2505 determines the size of a mode image from the objective area specified by the shape identifier stored in shape database 2503. Then, image cutout unit 2505 cuts out image segments having the same size through moving a window from the input image as shown in FIG. 23 (Step 2702).

Shape classifying means 2506 receives one image segment from image cutout unit 2505 and the base vector from shape database 2503. Characteristic space projecting unit 1760 projects the image segment as a image segment vector in the eigenspace (Step 2703). Segment shape classifying unit 2561 receives the image segment vector from characteristic space projecting unit 2560 and the average vectors and covariances of the "sedan A"-type vehicle and the bus from shape database 2503 respectively, and calculates a Mahalanobis distance between the image segment vector and the average vector (Step 2704).

When the least Mahalanobis distances is less than a certain value (Step 2705), it is judged that the image segment contains an object of the shape pertinent to the average vector of the least distance (Step 2706). If the least distance is not less than the certain value, it is judged that the image segment contains no object to be identified (Step 2707). characteristic space projecting unit 2560 and segment shape classifying unit 2561 repeats the process from Step 2703 to Step 2707 for each of the image segments which are cut out from the input image (Step 2708). When it is judged that the image segment contains the object, output unit 2507 places the shape of the object over the image segment in the input image as shown in FIG. 24 (Step 2709). A resultant image is then released via I/F unit 1808 from output terminal 1813.

Embodiment 6

Figure 29:
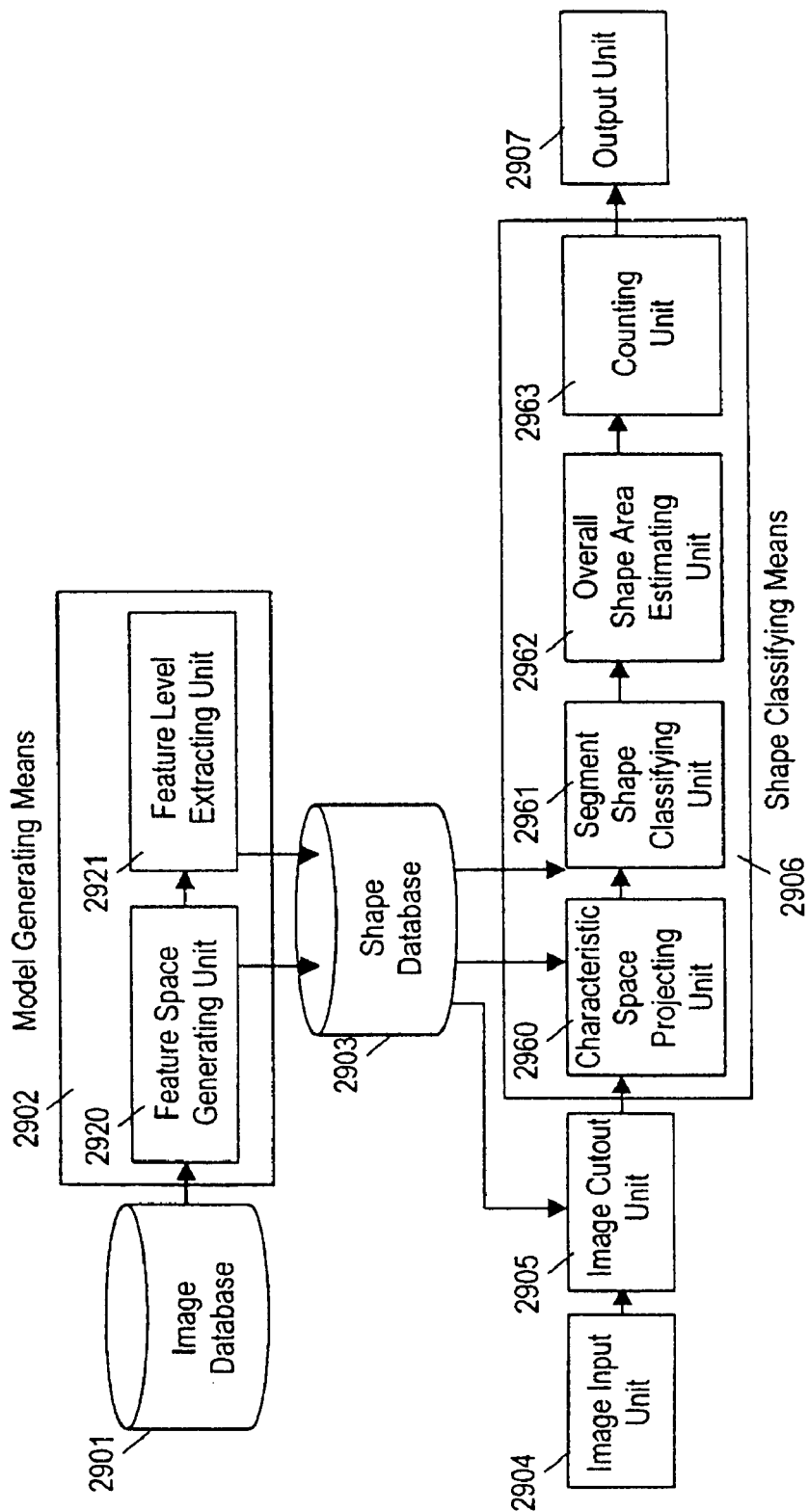
FIG. 29 is a block diagram of an image recognizing apparatus according to Embodiment 6 of the present invention.

FIG. 29 is a block diagram of an image recognizing apparatus according to Embodiment 6 of the present invention.

Image database 2901 divides each of gradation images of various objects of the shape to be identified into rectangular shape segments having a predetermined size and stores each of the shape segments with the shape identifier specifying a shape name, a file name, and coordinates at the upper left and the lower right corners of the shape segment. Model generating means 2902 retrieves all the gradation images of the object of the shape to be identified from image database 2901 and extracts its characteristic. Characteristic space generating unit 2920 generates a characteristic space from the pixel values of all the shape segments in each model image received from image database 2901 and transfers its base vector to shape database 2903 where each shape segment is projected as a model image local vector to the characteristic space. Characteristic level extracting unit 2921 calculates an average and variance of all the model image local vectors received from characteristic space generating unit 2902 for each shape segment and releases them together with the relevant shape identifier. Shape database 2903 receives the base vector of the characteristic space from characteristic space generating unit 2920 and the average and variance of the model image local vectors together with the shape identifier for each shape segment from characteristic level extracting unit 2921, and stores them. Image input unit 2904 supplies an input image to be determined whether an object of a shape to be identified is present therein. Image cutout unit 2905 is responsive to a shape identifier from shape database 2903 and cuts out an image segment having the same size as the shape segment from the input image. Shape classifying means 2906 examines whether or not an object of a shape to be identified is present in the image segment received from image cutout unit 2905. Characteristic space projecting unit 2960 projects the image segment received from image cutout unit 2905 to the characteristic space as an image segment vector based on the base vector received from shape database 2903. Segment shape classifying unit 2961 calculates a distance between the image segment vector received from characteristic space projecting unit 2960 and each average of model image local vectors retrieved from shape database 2903 and determines whether or not the image segment vector matches the shape segment of the shape of the object to be identified. As shape segment classifying means 2961 detects the shape segment of the shape of the object to be identified, overall shape area estimating unit 2962 estimates the area in which the overall shape of the object exists in the input image from the position of the shape segment in relation to the overall shape. Counting unit 2963 counts the position of the overall shape of the object received from the overall shape area estimating unit 2962 for each image segment containing the shape segment of the shape of the object. Upon judging that the object is located at the position which is determined a number of times greater than a certain number by counting unit 2963, output unit 2907 displays the shape and the position of the object on a display.

Figure 30:
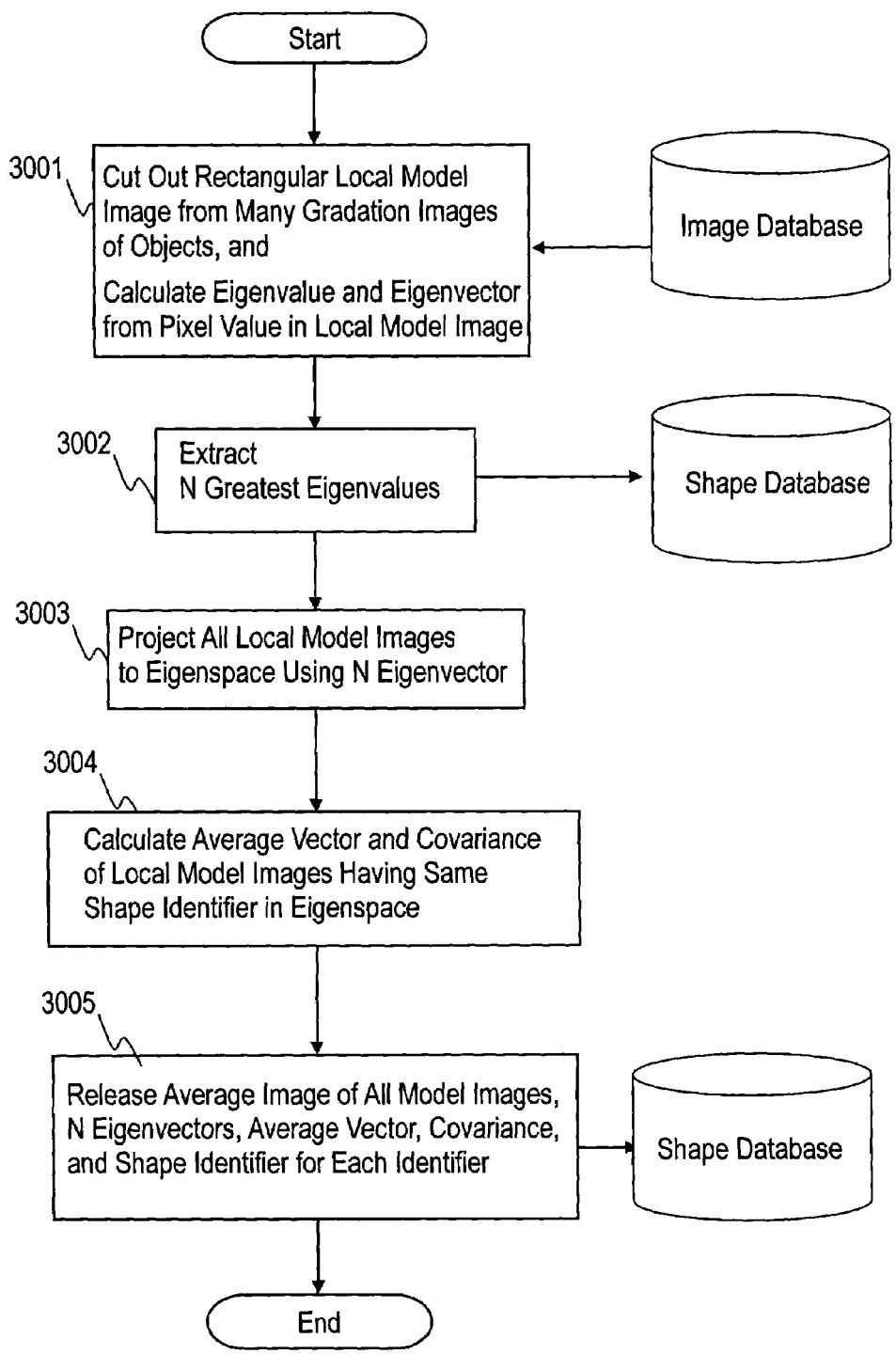
FIG. 30 is a flowchart showing a procedure of an operation at model generating means of Embodiment 6.
Figure 31:
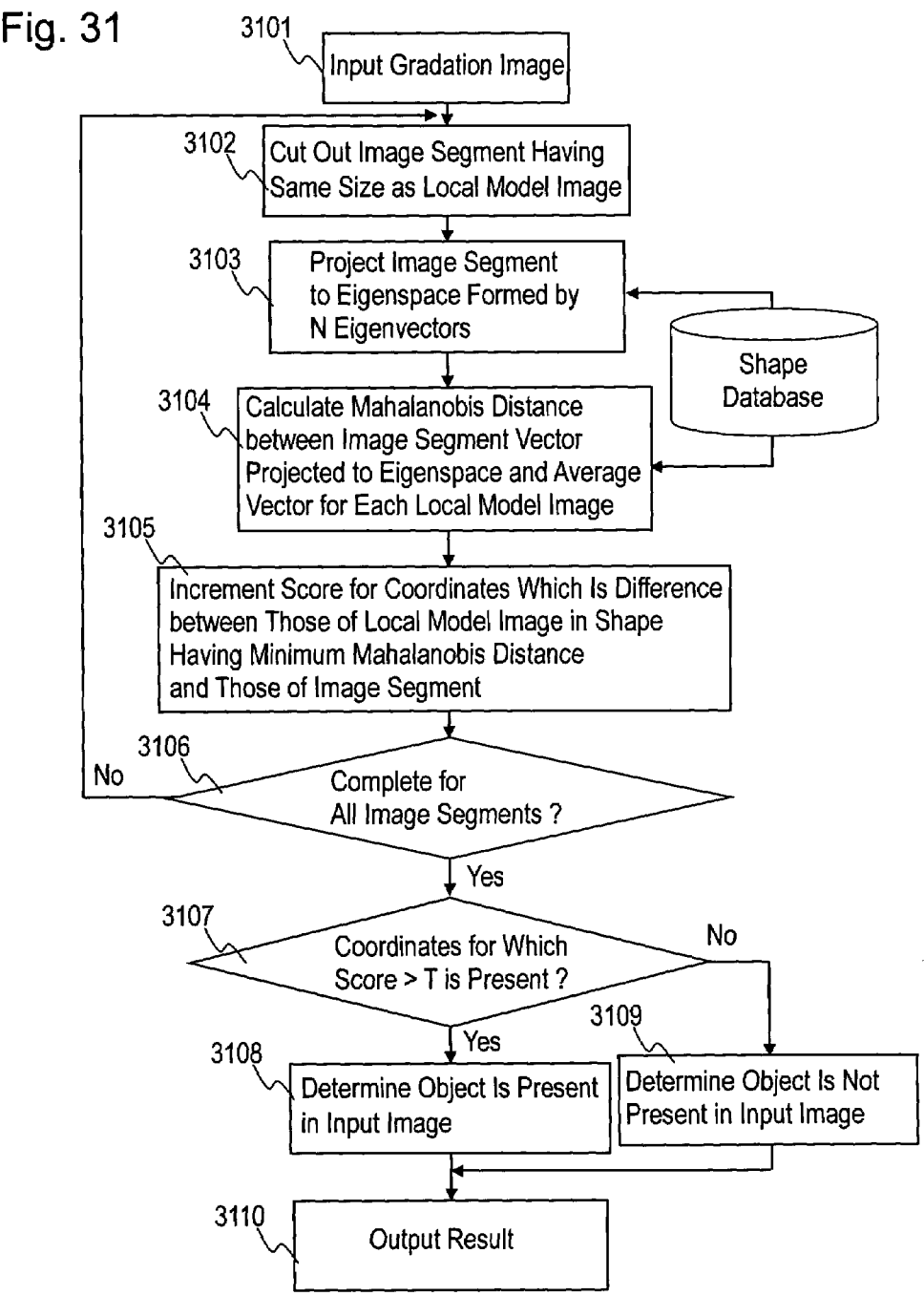
FIG. 31 is a flowchart showing a procedure of an operation at an image input unit through an output unit in Embodiment 6.
Figure 32:
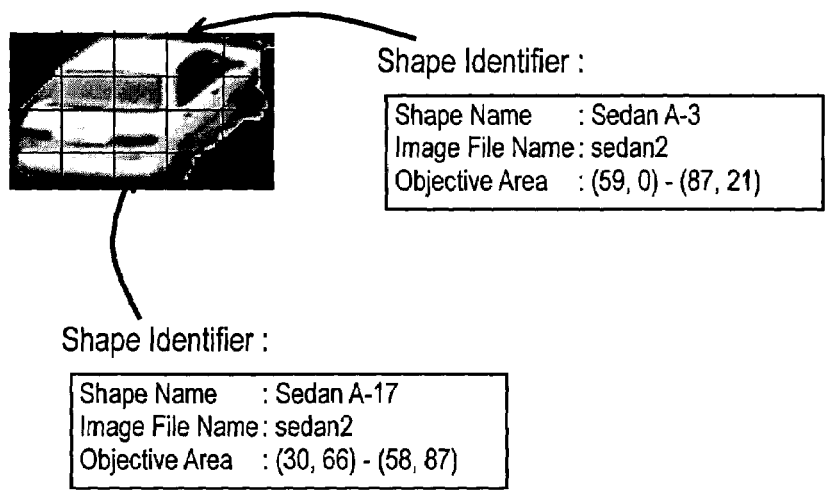
FIG. 32 illustrates an example of model images and its shape identifier stored in an image database of Embodiment 6.
Figure 33:
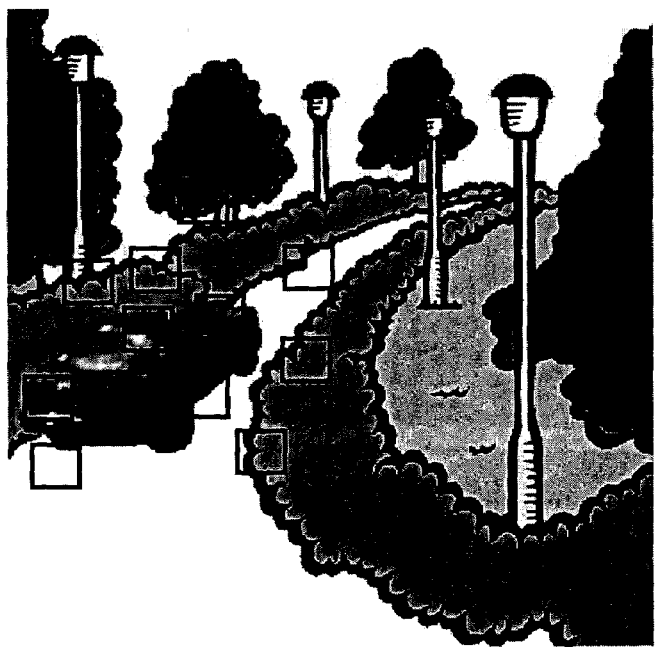
FIG. 33 illustrates examples of rectangular segments cut out by an image cutout unit of Embodiment 6.
Figure 34:
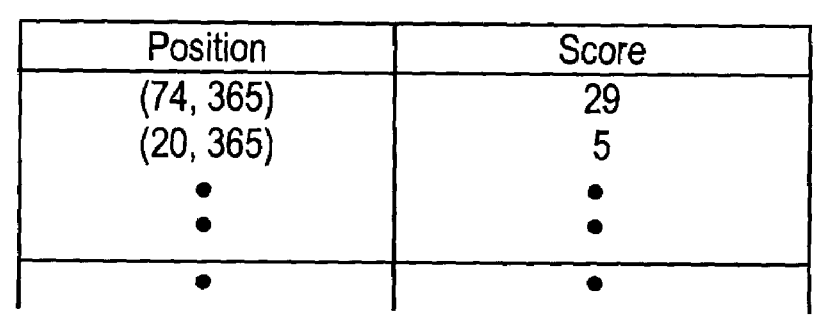
Figure 35:
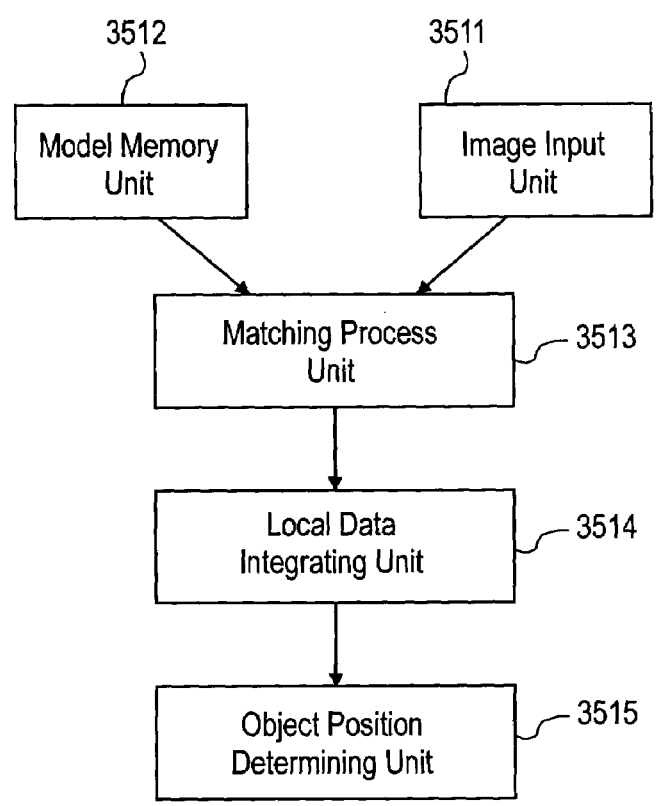
FIG. 35 is a block diagram showing a conventional image recognizing apparatus.
Figure 36:
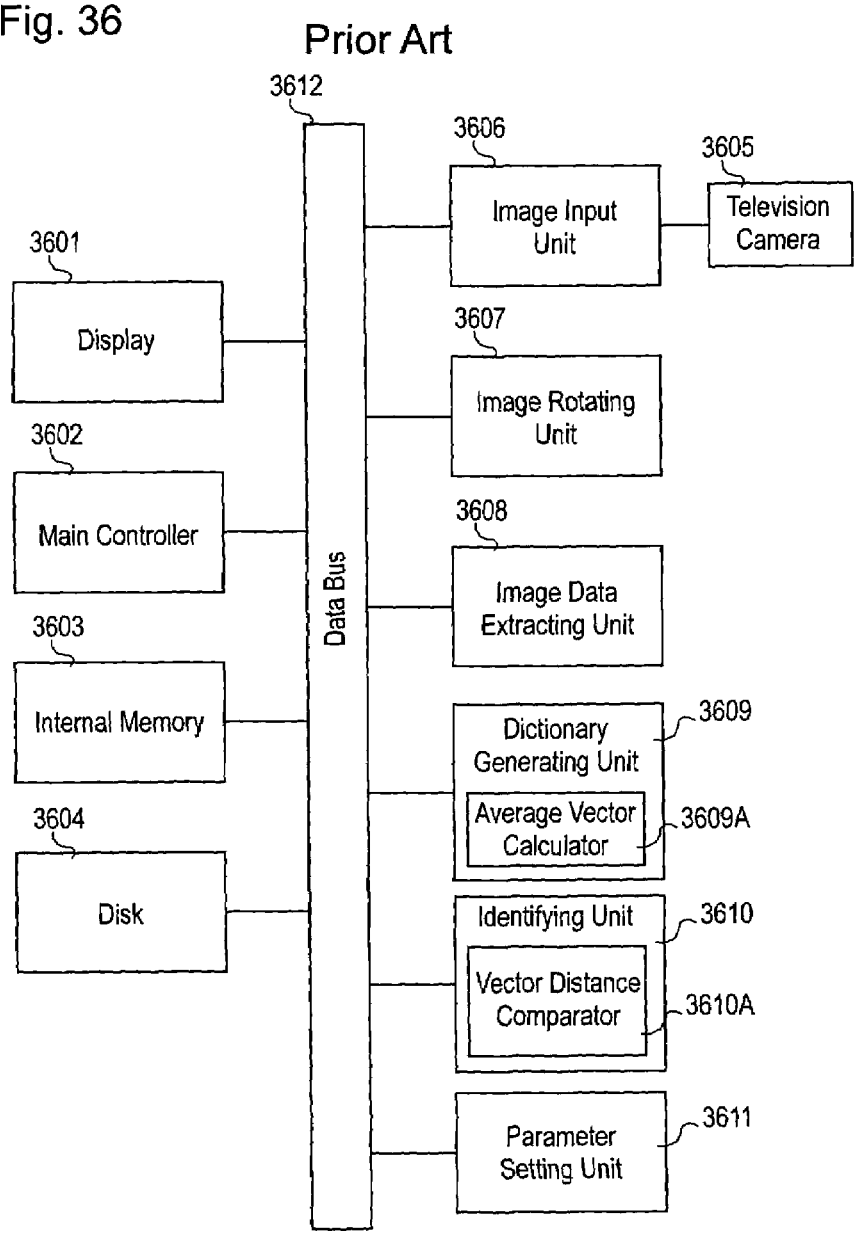
FIG. 36 is a block diagram showing another conventional image recognizing apparatus.

The operation of the image recognizing apparatus having the above arrangement is now explained referring to the flowcharts shown in FIGS. 30 and 31. FIG. 30 is the flowchart showing an operation of the model generating means. FIG. 31 is the flowchart showing a procedure from inputting an image to be examined through outputting a result of recognition. FIG. 32 illustrates examples of the model image stored in image database 2901. FIG. 33 illustrates an input image which is received from image input unit 2904 and includes rectangular image segments cut out by image cutout unit 2905. FIG. 34 illustrates a resultant output of counting unit 2963. The resultant output of shape classifying means 2906 to be displayed on the display is shown in FIG. 24.

Prior to the recognition, data about the shapes to be identified are prepared. Image database 2901 stores gradation images of the object in the form of files such as shown in FIG. 32. Each gradation image is divided into localsegments having a predetermined size of a rectangular and each local-segment is accompanied with the shape identifier specifying a local-segment name, a file name, and the coordinates at the upper left and the lower right corners of the local-segment. The local-segment name comprises the name of an overall shape of "sedan A" of the object, and a number identifying the local-segment in the overall shape. The number denotes the same position regardless of the overall shape of the object to be identified. The localsegments may overlap each other. FIG. 32 shows an example of a model image for identifying a sedan-type vehicle captured by a camera from the shown angle and distance. Actually, local-segments of plural images of similar looking sedan-type vehicles are stored together with shape identifiers of the local-segments.

When the "sedan A"-type vehicle such as shown in FIG. 32 is an object to be identified, model generating means 2902 retrieves all the model images of vehicles accompanied with the shape identifier of "sedan A" from image database 2901 and transfers them with the shape identifiers to characteristic space generating unit 2920. Generating unit 2920 calculates an eigenvalue and an eigenvector from the pixel value in each rectangular local-segment in the model image accompanied with the shape identifier as a local model image (Step 3001). The local model images in each model image are equal in the size, each consisting of 29 pixels in horizontal by 22 pixels in vertical as shown in FIG. 32. To calculate the eigenvector, a vector which is a row of the pixels in each local model image is generated, and an average of the vectors is calculated and subtracted from each vector for determining the eigenvalue and an eigenspace.

Characteristic space generating unit 2920 generates the eigenvector corresponding to N greatest eigenvalues as the base vector, and shape database 2903 stores it (Step 3002). Using the N eigenvalues, characteristic space generating unit 2920 projects each local model image in the characteristic space to generate a local model image vector (Step 3003). Characteristic level extracting unit 2921 receives the local model image vector with its shape identifier from characteristic space generating unit 2920 and calculates an average and covariance of the local model image vectors accompanied with the same shape identifier (Step 3004). Characteristic level extracting unit 2921 releases the average of all the local model images and the average and covariance of local model vectors for each shape, and shape database 2903 stores them together with their corresponding shape identifiers (Step 3005).

For recognition, an image to be determined whether an object to be identified is present therein is supplied from image input unit 2904 (Step 3101). Image cutout unit 2905 calculates the size of a local-segment from the objective area determined by the shape identifier stored in shape database 2903. Then, image cutout unit 2905 cuts out each segment having the same size from the input image through moving a window as shown in FIG. 33 (Step 2702).

Shape classifying means 2906 receives one image segment from image cutout unit 2905 and the base vector from shape database 2903. Characteristic space projecting unit 2960 projects the image segment in the characteristic space as a partial image vector (Step 3103). Segment shape classifying unit 2961 receives the image segment vector from characteristic space projecting unit 2960 and the average vectors and covariances of local-segments of "sedan A" from shape database 2903 to calculate a Mahalanobis distance between the image segment vector and each average vectors (Step 3104). Then, classifying unit 2961 releases the shape identifier belonging to the local-segment having the average vector pertinent to the least distance.

Overall shape estimating unit 2962 calculates a difference between the coordinates at the upper left corner of the objective area defined by the shape identifier and the coordinates at the upper left corner of the image segment in the input image, and counting unit 2961 increments the score for the coordinates by one (Step 3105). The coordinates for which score is incremented represent the position of the object in the input image.

Shape classifying means 2906 including characteristic space projecting unit 2960 through counting unit 2963 repeats the process from Step 3103 to Step 3105 for all the image segments which are cut out from the input image (Step 3106). The result in counting unit 2963 is shown in FIG. 34. In FIG. 34, a series of the coordinates are listed with the score for them in the order from the highest score. When the score for the coordinates is greater than a certain number (Step 3107), it is judged that the object is present at the coordinates in the input image (Step 3108). Then, output unit 2907 places the shape of the object over the image segment in the input image as shown in FIG. 24 (Step 3110). If none of the scores is greater than the certain number at Step 3107, it is then judged that the input image carries no object to be identified (Step 3109), and the input image is directly released (Step 3110). A resultant image is then released via I/F unit 1808 from output terminal 1813.

As set forth above, the object recognizing apparatuses of the present invention can readily detect a characteristic of a shape of objects from a less amount of model data even if the surface color of the object is different. Also, even if an object to be identified is partially visible in an input image, the apparatuses of the present invention can detect its shape and position can be detected at higher accuracy.

What is claimed is:

1. An image recognizing apparatus for detecting a shape of an object from an image, comprising:
   an image database storing a shape identifier and images of objects as model images corresponding to the shape identifier, each of the objects having a same shape, the shape identifier including information for representing the shape of each of the objects and position information for indicating a oortion of a shaoe segment in the shape;

model generating means for calculating a base vector in a feature space from pixel values of model image segments each of which is provided by dividing each of the model images, for projecting the model image segments in the feature space as model image segment vectors, for calculating statistic values from the model image segment vectors, each of the model image segments having a same shape segment, and for adding the shape identifier to feature statistic values to provide a feature shape parameter;

a shape database for storing the base vector and the feature shape parameter;

an image input unit for supplying an input image;

an image cutout unit for cutting out the input image to provide input-image segments;

shape classifying means operable to project the input-image segments in the feature space to provide input-image segment vectors based on the base vector, respectively, compare the input-image segment vectors with the model image segment vectors using the feature shape parameter to estimate overall areas which the object occupies in the input image from position information included in the shape identifiers of respective model image segment vectors most similar to the input-image segment vectors, count a number of times an area out of the estimated overall areas is estimated, and determine that the object having the shape is present at the area in the input image if the number is greater than a predetermined value so as to output the area as a position of the object having the shape; and an output unit for releasing data indicating the shape of the object and the position of the object in the input image if the object having the shape is present in the input image.

2. The image recognizing apparatus according to claim 1, wherein said model generating means is operative to calculate the feature shape parameter from an average vector and a covariance matrix of the model image segment vectors.

3. The image recognizing apparatus according to claim 1, wherein said model generating means is operative to calculate an average image of the model image segments for the shape segment, to calculate the base vector from a pixel value of the average image, to project the model image segments in the feature space as the model image segment vectors, and to add the shape identifier to the model image segment vectors.

* * * * *

UNITED STATES PATENT AND TRADEMARK OFFICE
CERTIFICATE OF CORRECTION

PATENT NO. : 7,054,489 B2  
APPLICATION NO. : 10/677866  
DATED : May 30, 2006  
INVENTOR(S) : Megumi Yamaoka et al.

It is certified that error appears in the above-identified patent and that said Letters Patent is hereby corrected as shown below:

Column 16  
Line 66, change "oortion" to -- portion --

Column 16  
Line 66, change "shaoe" to -- shape --

Signed and Sealed this

Nineteenth Day of September, 2006

JON W. DUDAS  
*Director of the United States Patent and Trademark Office*